(12) United States Patent
Dulin et al.

(10) Patent No.: US 8,068,023 B2
(45) Date of Patent: Nov. 29, 2011

(54) SYSTEM FOR MAINTAINING SECURITY OF EVIDENCE THROUGHOUT CHAIN OF CUSTODY

(76) Inventors: Jacques M. Dulin, Sequim, WA (US); Kerry Berland, Chicago, IL (US); Paul Berland, Elgin, IL (US); David Reid, Carpentersville, IL (US); Rogers Brackmann, St. Charles, IL (US); Dennis Kossnar, Batavia, IL (US)

( * ) Notice: Subject to any disclaimer, the term of this patent is extended or adjusted under 35 U.S.C. 154(b) by 457 days.

(21) Appl. No.: 11/962,084

(22) Filed: Dec. 20, 2007

(65) Prior Publication Data

US 2010/0265068 A1  Oct. 21, 2010

Related U.S. Application Data

(63) Continuation-in-part of application No. 11/959,444, filed on Dec. 18, 2007, and a continuation-in-part of application No. 11/375,504, filed on Mar. 13, 2006, now Pat. No. 7,482,928, and a continuation-in-part of application No. 11/128,879, filed on May 13, 2005, now Pat. No. 7,714,708, and a continuation-in-part of application No. 10/330,149, filed on Dec. 27, 2002, now Pat. No. 7,011,217.

(60) Provisional application No. 60/871,027, filed on Dec. 20, 2006, provisional application No. 60/374,871, filed on Apr. 22, 2002, provisional application No. 60/344,010, filed on Dec. 28, 2001.

(51) Int. Cl.
*G08B 1/08* (2006.01)
*G08B 13/14* (2006.01)

(52) U.S. Cl. ............ 340/539.13; 340/539.11; 340/572.1
(58) Field of Classification Search ............... 340/539.1, 340/539.11, 539.13, 539.26, 568.1, 572.1, 340/572.4, 10.1; 312/1; 427/1, 145, 261; 705/22, 58
See application file for complete search history.

(56) References Cited

U.S. PATENT DOCUMENTS

| | | | | |
|---|---|---|---|---|
| 6,048,570 A | * | 4/2000 | Poole | 427/1 |
| 6,851,769 B2 | * | 2/2005 | Hauville | 312/1 |
| 6,919,803 B2 | * | 7/2005 | Breed | 340/539.14 |
| RE40,073 E | * | 2/2008 | Breed | 340/539.14 |
| 7,469,977 B2 | * | 12/2008 | Hauville | 312/1 |
| 2007/0219916 A1 | * | 9/2007 | Lucas | 705/58 |

\* cited by examiner

*Primary Examiner* — Van T. Trieu
(74) *Attorney, Agent, or Firm* — Innovation Law Group, Ltd.

(57) ABSTRACT

An evidence chain of custody system that is application-specific auditable and trackable secure smart mobile containers (SMC) for securely storing evidence items that are collected at crime scenes and search locations pursuant to subpoenas or warrants. Each SMC includes a electronics package that can read RF tags applied to evidence bags or totes placed in the SMC or for oversized items, associated with the event or scene, that are tagged with active RF tags. The electronics package also includes condition sensors and an RF transmitter module to permit remote reporting and monitoring of GPS/RSSI location and condition. The SMC includes an electronic lock that provides access security and an audit trail of all opening, closing, and other events.

36 Claims, 6 Drawing Sheets

SYSTEM FOR MAINTAINING SECURITY OF EVIDENCE THROUGHOUT CHAIN OF CUSTODY

CROSS-REFERENCE TO RELATED APPLICATION

This application is a Non-Provisional Application of U.S. Provisional Patent Application 60/871,027, filed on Dec. 20, 2006 entitled System for Maintaining Security of Evidence Throughout Chain of Custody. This application is also a Continuation-In-Part Application which claims priority to U.S. application Ser. No. 11/959,444, filed on Dec. 18, 2007 entitled Underdeck Carrier System for Mobile Containers for Segregating Product Types in Common Shipment, to U.S. application Ser. No. 11/375,504, filed on Mar. 13, 2006, now U.S. Pat. No. 7,482,928 entitled Private Pallet-Box Cargo Shipping System, and to U.S. application Ser. No. 11/128,879, filed on May 13, 2005, now U.S. Pat. No. 7,714,708 entitled Small Pallet-Box Cargo Container, and a Continuation-in-Part Application which claims priority to U.S. application Ser. No. 10/330,149, filed on Dec. 27, 2002 entitled Private Pallet-Box Cargo Shipping system, which issued as U.S. Pat. No. 7,011,214 on Mar. 14, 2006, which claims priority from U.S. Provisional Application No. 60/374,871, filed on Apr. 22, 2002 entitled Private Pallet Box Shipping System With Universal Hanger and Cam Lock Systems, and to U.S. Provisional Application No. 60/344,010, filed on Dec. 28, 2001 entitled Private Pallet Shipping System. All of the above-mentioned patent applications and patents are hereby incorporated by reference in their entirety.

FIELD OF THE INVENTION

The present invention is directed to a system and method for securely maintaining and verifiably tracking evidence for at least preserving the chain of custody of such evidence, for proper usability of such evidence in any forum in which such evidence may be needed. More specifically, the present invention is directed to a system and method in which a smart mobile container (SMC) is used to hold and track such evidence for securely maintaining and verifiably tracking this evidence for at least preserving chain of custody of such evidence.

BACKGROUND OF THE INVENTION

Maintaining a clear, secure and verifiable chain of evidence is an element critical to successful prosecution of the accused in many criminal cases. There are many high profile cases where the mishandling, misplacement or loss of evidence items results in the refusal of a district attorney to charge a suspect, the dismissal of charges by the judge, or a conclusion by the jury that the charges have not been proven beyond a reasonable doubt. Conversely, there are cases where accused persons may have been unjustly prosecuted or convicted by tainted evidence.

There are evidence handling systems and standard law enforcement procedures in place for the collection, logging, maintaining in storage, and handling of evidence. These systems are typically paper trail based: law enforcement personnel secure the crime scene with rope or plastic tape boundary markers. Trained evidence technicians and photographers meticulously go over the scene, photographing the scene, the layout and topology of items in the scene and the approaches, the technicians collect fibers, blood samples, glass, fragments of bullets, skin, hair, etc. and bag each item, marking the bags with location, date, time and other pertinent information. The crime scene materials are then transported to labs and police evidence storage, where the access is tracked by logs. A wide range of persons have access to the evidentiary items during the process of investigation, and later the discovery period pending trial, including: law enforcement personnel, evidence technicians, lab technicians, district attorneys and prosecutors, defendants, expert witnesses, defendants and witnesses. The evidence to be used at trial becomes segregated during discovery, and eventually brought to and used at trial. This includes both prosecution and defense evidence.

Often there is a substantial time delay between crime and trial. Evidence is stored in bankers-type boxes in wire cage lock-ups. There is turnover of personnel. Much of the logging records are not kept electronically, can be altered or lost, and the evidence is subject to damage or deterioration during storage.

The selected trial evidence must be transported to the trial court, maintained there during the trial and returned for post trial proceedings, including being sent to appellate courts as part of the record certified for appeal. In some instances, evidence is lost along the way, including even during presence at the trial court. Evidence disappears, or its integrity is compromised or questioned.

The cost of maintaining the evidence is substantial, and the many steps and multiple accessing of the evidence has the possibility of mistakes more a possibility than a probability. Proving integrity of evidence is also an element of the prosecutor's case that adds substantially to the cost of trial and often involves significant time of court, counsel and jury. In addition, some evidence items, including money, valuable items and drugs are targets for theft. Responsibility is often excused or deflected by reference to sloppy or negligent procedures, lack of funding for secure storage facilities. The result is a substantial burden on the criminal justice system, as well as creates a significant embarrassment when loss/mishandling of evidence events occur.

Accordingly, there is a substantial and significant unmet need in the field of evidence handling to provide a secure, trackable, auditable chain of evidence custody and access that is easy to use, reasonable in cost, and substantially foolproof that will improve the present paper and personnel intensive procedures.

SUMMARY OF THE INVENTION

The present invention is directed to us of a secure smart mobile container (SMC) having a security system including RF tracking, RFID contents inventory, self-monitoring and/or pollable sensors and auditable electronic locks, to provide a secure, verifiable chain of custody of and access to forensic evidence from crime scene to courtroom, and through all intervening stages of access by authorized personnel, including law enforcement, evidence techs, experts, defense counsel, prosecutors, trial and appellate judges and jury. The tracking is by RF cell tower via IPSec to client or service VPN or Frame Relay with APN, Client and/or Network initiated, extended PDP contact or SSMS push to wake-up monitoring applications in the SMC, and includes GPRS/EDGE data transport and encryption. In addition, a GPS locator device is included in the SMC, with RSSI (received signal strength indication) location when no GPS fix is available. When GPS is not available, the RSSI information can be used to determine the distance from a cell tower to the SMC. Specifically, using RSSI information from three (3) cell towers, with a triangulation algorithm, this RSSI information can be used to specifically calculate the location of the SMC, which can then be converted to a coordinate system, such as latitude longitude, a mapping system, and/or some other translated information that can be used to understand and determine the exact location of the SMC. The evidence item SMC load/unload contents inventory is RF tag and reader enabled, using HF tags for evidence items stored in the SMC, and active RF tags in the 2-6 GHz range for external evidence items too large for the SMC that are associated with the other items, 2.4-5 GHz being preferred for the active tags. The evidence is preferably secured in the SMCs in metallized bags or totes.

More specifically, the present invention is directed to a system and method for maintenance, verification and certification of the chain of evidence of forensic items is maintained. The system and method includes the use of trackable and auditable SMCs along with a comprehensive, configurable, computer-enabled record keeping system. The evidence items are loaded into, or RF tagged for electronic association with, one or more SMC container(s) having an embedded electronic security system providing RF position location and tracking, RF contents inventory, self-monitoring and/or pollable condition sensors and auditable electronic locks, to provide a secure, verifiable chain of custody of and access to forensic evidence from crime scene to courtroom, and through all intervening stages of access by authorized personnel, including law enforcement, evidence techs, experts, defense counsel, prosecutors, trial and appellate judges and jury.

The tracking is by RF cell tower via IPSec to client or service VPN or Frame Relay with APN, Client and/or Network initiated, extended PDP contact or SMS push to wake-up monitoring applications in the SMC, and includes GPRS/EDGE data transport and encryption. In addition, a GPS locator device is included in the SMC, which can also use RSSI locating techniques when no GPS fix is available. As mentioned, when GPS is not available, the RSSI information can be used to determine the distance from a cell tower to the SMC. Specifically, using RSSI information from three (3) cell towers, with a triangulation algorithm, this RSSI information can be used to specifically calculate the location of the SMC, which can then be converted to a coordinate system, such as latitude longitude, a mapping system, and/or some other translated information that can be used to understand and determine the exact location of the SMC. In one embodiment, can evidence item can be directly tagged or the evidence item can be placed in an evidence item bag or other sub container and loaded into/unloaded from the SMC, and tracked during existence inventory within the SMC. An RFID tag reader within the SMC reads the tags associated which each evidence item during unload, during load and while in inventory via an encrypted RF tag communication, such as for example using encrypted HF and/or UHF RFID tags (such as HF tags at 13.56 MHz or UHF tags at 915 MHz), for tracking evidence items stored in the SMC, and/or encrypted active RF tag communication (such as within the 433 MHz to 6 GHz range) for external evidence items that may be too large to fit within the SMC, which are associated with the other items (with 433 MHz or 2.4 to 5 GHz range being preferred for the active tags).

The SMCs are provided in a wide range of sizes, the presently preferred being a version comprising a mobile container mounted on 4 casters (the SMC) that is small enough in one dimension to roll through standard doorways, and a smaller Courier sized version that includes a telescoping handle and two wheels, and is the size of a large roll-on luggage bag. One form of the SMC (or SMC as described therein) is described in detail in co-pending Provisional Application Ser. No. 60/870,456, filed Dec. 18, 2006, entitled UNDERDECK CARRIER SYSTEM FOR MOBILE CONTAINERS FOR SEGREGATING PRODUCT TYPES IN COMMON SHIPMENT, the disclosure of which is hereby incorporated by reference.

By way of example, the 4-caster SMC containers are typically rectangular, having exemplary dimensions on the order of 40" long×22"-33" wide×29"-33" high outside dimensions and 37½"×19"-30"×25½" inside dimensions, at a weight of 140-160 lbs. These dimensions permit the SMCs to fit through a standard entry/exit doorway opening of 28-36" width. However, it should be understood that the SMCs may be square, or smaller rectangles, e.g., the Courier size having two corner wheels and a telescoping handle. The size has typical dimensions of: 22.5 29"×17.5-18"×11.5-13' and inside dimensions of 20-17"×16.5-17"×10.5-12.5" at a weight of 35-45 lbs. An important feature of the SMCs is the provision of bottom-mounted wheels, either four corner-casters (standard SMC) or two fixed wheels (the smaller Courier size), that permit the SMCs to be loaded in the factory or office, rolled out and up ramps directly into the truck locker at the loading end, and permit the reverse movement at the destination end of the transit.

In addition, it is an important aspect of the invention that the SMCs may include specially sized totes that are smaller, optionally individually closable and fitted with individual electronic locks, which fit within the SMC interior load space. Thus, for example, evidence from each room of a crime scene location can be placed in their bags, and the bags placed in a tote dedicated to evidence from each of the rooms. The single electronic key can be programmed to unlock all totes in the SMC or only selected ones. In addition, one electronic key may be required to open the SMC electronic lock, and another, held by a different authorized person, used to open the individual tote(s). Thus, the evidence storage supervisory law enforcement person may have the SMC master key, and individually differently ID-coded e-keys issued separately to defense counsel, prosecutors, laboratories, etc. In that way, the lock flash memory keeps track of the openings by the individual e-key serial numbers, along with the dates, time open, time closed, location etc., as configured in the management software package of the present system. For example, the standard 4-caster SMC may be fitted with 6 totes.

The SMCs are fitted with sophisticated electronic locks, sensors and alarms, as well as one or more RF communications via cell phone tower networks and GPS locator module(s) that "radios" to a base station the time, location and status of the SMC evidence container, and any anomalous events, including unauthorized attempts to open or break into the container, or potential damage events such as fire, exposure to high temperature, radiation, biological contaminants, unauthorized movement, shock and the like. In addition, both the locks and communication modules are programmable, and provide extensive, and selectably pollable and downloadable event, access and transport history and audit trails. The RF communication system permits remote tracking and real time status check via the cell tower network, thence an Internet IPSec to a VPN or Frame Relay, and includes GPRS/EDGE encryption. The customer may internally distribute via its VPN, LAN or WAN, or wireless networks. The preferred communication system employs RF broadcast of encrypted data to remote control and monitoring site via one or more cellular telephone cell tower network(s) as a virtual private network. With respect to location, when no GPS fix is possible (the GPS antenna must "see" the sky), the location is provided by Relative Signal Strength Index monitoring from individual cell tower locations to obtain range and direction information to provide location data on the broadcasting SMC. In densely populated areas, where towers are typically a mile or so apart, the location accuracy is quite good.

In the present system, a single SMC, being wheeled, may be programmed at the law enforcement facility, taken to a crime scene, loaded with the bagged evidence as the scene is processed by the evidence technicians, then closed, electronically locked, wheeled back to van or truck and returned to the evidence storage location. Each bag has an appropriate RFID tag with a unique serial number. The tag ID is encrypted, and the identification can include unique indicia, such as law enforcement agency ID, case ID, date, location, responding personnel and the like. For evidence in bags placed in the SMC container, the bag RFID is preferred to be a passive tag, such as an HF tag.

It is an important aspect of the invention that in some cases, some of the evidence will not fit in the SMCs, such as a rifle, an axe, an auto, etc. In these cases, the item is separately bagged and tagged, or tagged with a secure lanyard, such as a zip tie, wire or the like. The tags of these items is preferred to be an active RFID tag, such as a 433 MHz or 2.4-5 GHz tag that is coded to identify the associated SMC container to which the evidence relates. The RFID reader in the container reads both the encrypted passive HF and the active RF tags of the over-size, associated item of evidence, and the data is stored in memory in the electronics package of the SMC. In addition, as the tags are placed on the bags and items of evidence and read, the RF transponder of the SMC can radio out the event in real time back to the law enforcement HQ so that there is a record of collection time and location. If the separate but associated (related) item of evidence is not kept within 20-50' of the SMC the loss of signal is noted by the RFID reader in the SMC electronics module, and that event recorded. That event can also initiate the sounding of an alarm or warning lights on the SMC. Thus if an item is inadvertently not placed in the same transport van with the SMC, the law enforcement personnel are alerted before it is left behind. All subsequent handling of the evidence items are similarly tracked so that a complete audit report of location and access is maintained electronically and can be printed out for easy authentication and prove up at trial. This system encourages defense counsel to stipulate to proper handling of the evidence, so that and related issues are resolved before trial.

Thus it is seen that in accord with the system of the invention the items that are stored in the SMC pass within close proximity of the RFID reader antenna and thus can use inexpensive passive RF tags, as the read distance is short range, on the order of 1-2'. The active RFID tags are used with the associated oversize items as the read range is on the order of 20-50', and the SMC can be maneuvered within that range to read those tags to complete the recording. The standard practice of tagging everything remains the same; that is the system fits within the current evidence capture infrastructure procedures.

Once the SMC is closed and locked, the embedded tracking system is initialized. The electronic lock captures the dates and times of opening and closing, and permits those actions only by means of authorized keys. The audit trail also logs attempts to open by unauthorized keys, and can send alert messages in case of detection of anomalous events. Each SMC includes an electronics package that has various condition sensors and an RF transceiver that radios out to the virtual private network via cell towers its location, time and internal state.

Thus, together, the trackable location and call-home functionalities, the lock auditing and condition sensors of the embedded electronics package in the SMC comprise a multilayered intelligence system. It provides monitoring, tracking and mitigation of condition, location and anomalous events, as well as a verifiable audit trail of all evidence handling events. The result is total veracity of the evidence handling chain of custody from scene to courtroom.

The internal SMC electronics package includes, an RF tag reader, preferably using a communications protocol, such as a protocol like the 802.15.4 low level communications protocol, to read 13.6 MHz (HF) passive chips (tags) or UHF, C162 tags at 915 MHz, on evidence items loaded into the SMC, and 2-6 GHz active chips that are placed on oversize evidence items associated with that crime scene or case 900 MHz UHF passive tags are not preferred under the scope of this invention, as such frequency may adversely affect biological evidence, and the reader for such tags require high drain power sources. In the case of 433 MHz or 2.4 GHz active tags, the biological evidentiary specimens may be placed in metallized bags or totes, that is, plastic (such as a plastic tote) coated with a fine layer of metal (such as aluminum) to serve as a screen against the RF signal to prevent any damage to the contents. However, such metallized bag/tote packaging can be used universally, that is, for all evidence items, just to insure no RF effect on the contents. Since most evidence items are small and stored in the SMC, the HF tags are used for those evidence bags, and the reader of the electronics package of the SMC can read the tags as the evidence bags are loaded and unloaded. Likewise, the active 2-6 GHz tags are preferable for use with biological evidence specimens, even those stored inside the SMC, as they may have to be handled in a lab for analysis, where the 50' radius will be adequate to track them during presence in the lab. For the active tags, 433 MHz or 2.4-5 GHz is presently considered the best mode, particularly when packaged in the aluminized RF-protective bags or totes. The frequency of the transmission is selected in a range so as to not affect biological evidence specimens, particularly when packed in the RF-protective bags or totes, defined herein generally as to not be a substantial resonant frequency of hydroxyl or amine radicals at the power levels employed, as measured in the bags or tote containers. The active tags employ an RF transmitter and battery in a unit the size of a key fob.

Preferably, the evidence bags are sealed with the RFID tag located on the seal in such a way that breaking the seal to access the bag can be detected by the reader. For example, the bag itself can include fine wires embedded between laminated layers forming the bag so that opening or cutting open the bag severs wires, the capacitance or antenna characteristics change and the reader is able to detect the change, record the event and time, and radio out an alarm.

In a preferred embodiment, each SMC is loaded with on the order of 4-8 totes, which are closable trays having side walls and lids for containing evidence items. Each tote is uniquely identified, using an addressable active 433 MHz or 2-6 GHz RF tag. As the totes are placed into the SMC the reader of the electronics package detects (over a range of 20-50' depending on antenna configuration, length and location) each tote, and records to memory the load or unload event. The same occurs for the HF or UHF tagged evidence bag items or totes; however, that is a short range read, on the order of 1-2', again depending on the antenna configuration. Together the passive HF or UHF, or active RF tag reader is able to provide a load/unload log; in short, it provides an inventory log. Paired with the location data, and the key identification and authorization data and time, a complete picture of the who, when, where and what is recorded and relayed via the RF virtual private network in essentially real time to law enforcement personnel, tracking control authorities and the like, as appropriate.

The 4-caster mini-pallet box SMC embodiment includes hinged, L-shaped, flanged lock plate that covers the opening side of the SMC lid. In this first embodiment, the lock plate covers a housing for an electronic lock, when raised, the lock plate completely covers the lock body, and includes a latch plate with a hole that engages the plunger of the electronic lock. In addition, the lock plate, when closed, covers a pair of spaced cam or snap type lid locks. The cam locks enable the lid to be cinched down, hermetically sealing the lid to the SMC. The cam locks are also completely covered by the flanged lock cover plate. Thus, to resist tampering; there are no exposed parts that act as a purchase for a pry bar.

In a second embodiment, a smaller, Courier size container having only 2 wheels and a telescoping handle in a configuration akin to a large roll-away suitcase, may be used for smaller volume of evidence. Alternately, a Courier SMC can be dedicated to each room of a crime scene. The Courier SMC also includes the electronics package and functionalities described herein. In this configuration, the L-shaped lock plate is hinged adjacent the side wall edge of the lid so that it folds up to open and down to close, the reverse of the full-sized standard SMC. The lock mechanism is contained in the lock plate. In the standard SMC a striker plate having a hole there-through to receive and engage the male lock shackle mechanism is secured to the side wall of the container. The striker plate includes the lock contacts to complete the electrical circuit to the lock electronics contained in the electronics package inside the courier container. In the Courier SMC, the lock portion in the lock plate includes rotatable tangs that engage retaining shoulders and complete the circuit to the lock electronics.

In both container embodiments, the preferred lock system is a hardened electronic lock mechanism that permits identification of which "keyholder" (approved access-person or organization) opens the lock(s), when the lock(s) is/are opened, how long the lock(s) stay opened, when each are closed by the key, and, optionally, the location. The locks are hardened with steel shell, bolt and plug face. Each key and lock is uniquely identified, and there are virtually unlimited unique lock codes. The open/close time parameters can be configured to record either pre-set or actual opening and closing times in both the lock (in the SMC) and in one or more keys. The recorded times are downloadable, either by direct connection of the key to a PC, or by connection of the SMC lock via an external RS 232, USB or FireWire port, to a hand-held device, such as a Laptop or PDA, or the openings/closings can be radioed to a remote, home base. Thus, if there is an attempt to open that is outside the authorized time, an alert can be radioed to the law enforcement authorities, the court, defense counsel, or to a monitoring station service facility or service provider. By way of example, a suitable electronic lock is the NexGen high security electronic lock, Model 65 series, or Pal-Loc model, provided by Medeco Inc. of Salem, Va., USA, a division of Hillenbrandt Industries, Inc.

The locks and keys are uniquely identified, mating and programmable, including both at a home base and in the field, and each includes static memory to store several thousand downloadable access events to provide a full audit trail. The programming includes configuring the key to authorize its use to open one or more SMCs or totes, to select the time, and by integration with the RF transmitter, controller and GPS module in the box, the location at which the box can be opened or/and locked. Thus, the boxes can be both authorized-entry/unlock and destination restricted to prevent unauthorized keys or persons from opening and closing the container. Once the key opens the lock, the RFID reader is awakened, and can read any removals or additions to the SMC. In addition, the keying event can awaken the RF transmitter to transmit the event to home base.

One significant feature of the pallet boxes is that the pallet boxes are each integrated (complete), and highly tamper resistant. That is, there are no loose parts that can be lost during use or storage, and the material is selected for strength to resist both casual and relatively concerted theft attempts. The lock is integrated in the exoskeleton, the top is flex-pry resistant, and the communication module includes location and links to sensor systems associated with the SMC (embedded into, secured onto, or disposed in the SMC internal storage volume) to provide real-time state-of-the container data.

The SMC and Courier containers each have a lid that is configured with a mating lip groove and rib to prevent insertion of tools or unauthorized inspection devices. The lid lip is preferably provided with a substantially hermetic seal element, for weather tightness, security and to assist in gas sampling evaluation of content integrity. This feature provides security for the law enforcement agency for highly sensitive cases, and is of great benefit for maintaining the integrity of biological evidence specimens and other contents requiring high-security due to the nature or the sensitivity of informational content. In combination with the lip seals, a port is optionally provided for evacuation of the container, or purging of the container with an anti-microbial or anti-pathogen gas, or pressurized with a security gas (which may include an anti-pathogen gas) to protect or sample the contents, or to expose a thief to a lethal or sub-lethal, incapacitating or marking gas or other fluid upon unauthorized breach of the SMC walls or attempts to pry open the SMC.

The SMC may also be provided with a battery/condenser system so that an unauthorized person is shocked with high voltage upon attempts to open the box. In storage, the SMC is preferably connected to 120 V power supply of the storage facility to keep the internal electronics package fully powered. If the plug is pulled, the battery condition monitor notes when the voltage drops and radios out to the monitoring center that the SMC is loosing power so that corrective steps can be taken. In addition, the 120 Db alarm on the SMC can be activated so that nearby personnel can plug the SMC into local power.

As the SMC/Courier containers are locked and the integrity verifiable, the containers can be securely left at the receiving evidence facility for storage until the appropriate, authorized person(s) arrive to inspect and evaluate the evidence.

In connection with tracking and enhanced security, each SMC is provided with a sensing and communications module comprising sensors, controller, RF transceiver, GPS locator unit, battery and trickle charger. The sensors are typically located in the electronics package, and optionally include an intrusion sensor system, such as a shock, breach or vibration sensor that is connected to, or in wireless contact with the controller to provide a silent or audible alarm. In one embodiment, the intrusion sensor comprises a liner-type insert comprising a conductive screen mesh adhered to the outside of a thin, rigid sheet (of ABS plastic, for example) that is electrically connected to the controller.

The preferred intrusion sensor is the emplacement of a vibration sensor in the electronics package, or on one or more walls, top and/or bottom to detect penetration attempts. In this connection, The SMC or Courier container includes external exoskeleton at least on the top lid, and optionally on one or more of the side walls and bottom. It is preferred, at least in the Courier size SMC container to include a laminated armor sheeting of expanded metal grid bonded between two sheets of plastic as an insert retained adjacent the inner back and short-side end walls. If desired a laminate sheet can also be included on the bottom, or/and between the front side wall inner side and the electronics package placed adjacent thereto. That is, an armor sheet can be used between the electronics package and the inner wall of the SMC container to which it is secured. However, for the Courier SMC it is not absolutely required to have the expanded metal laminate armor sheet on the bottom or between the electronics package and the inside adjacent wall as the vibration sensor would be easily triggered by attempts to break into the container through those walls, first, due to the proximity of the sensor to the front wall, and second, because of the presence of the handle assembly molded into the bottom wall. The extra assembly materials make intrusion through the bottom less likely.

Other sensors that may be disposed in the box or in association with one of the side walls, top or bottom walls include ultra-short range battery-powered RF or hard wired sensors that report internal or external sensed condition data to the controller. The sensors can trigger alerts and alarms, e.g., audible or silent, such as warning horns or RF transmission alert of a breach attempt, or movement of the box out of a predetermined transport path or location (linked to a GPS unit in the SMC or location determined by RSSI cell signal strength). The GPS unit or the cell RSSI inputs location data to the controller which sends out data burst transmissions on pager, cell phone or other network frequencies to relay stations or to one or more home base(s) for track and trace functionality. Instead of the breach screen or vibration sensor, one or more RF sensor(s) can be used to detect breaching of the container walls, top or bottom, such as an IR, US (Ultra-Sound) or light detecting sensor that sends a signal to the controller if an aperture as small as a crack forms in any of the box walls.

It is a significant aspect of the present evidence integrity system to provide one or more still or video cameras installed in each SMC for monitoring of opening events, or conditions inside the SMC during storage or transport. A battery-powered flash chip is supplied in association with a CMOS camera. The camera can be programmed to take an initial series of pictures once the lid is opened a pre-selected angle, and than one per second or few seconds up to one per minute or few minutes. The pictures are both saved locally (in the SMC memory) and uploaded and transmitted to monitoring base.

Narcotics and explosives detection may be enabled with miniature reactive chemical sensors or electro-chemical sensors, such as a GE StreetLab unit. A positive output can be linked to the controller for radioing an alert or in-SMC non-baseline, abnormal or anomalous condition. Thus, in the case of a narcotics case, the baseline condition is presence of narcotics, rather than absence of sensing a narcotics signature. Upon unauthorized removal of the narcotics, e.g., in the case of theft for resale or use, the concentration will fall and the decline noted and an alert sent.

The SMC data communication and management system includes a mother board having sensors, lock event access, alerts, alarms, cameras, container "armed" status lights, data encoders, transmitters and/or transceivers, computer programs, data bases, and related equipment to enable activation, coding, decoding and use of the data communications system, including real time and past history display of status and location, and management and operation report generation. The SMC container monitoring and management electronic data communications system(s) include(s) container-mounted, fitted or embedded components, separate remote signal relays (towers and satellite), monitoring station components, and auxiliary equipment including locators (GPS and RSSI locators) and locking systems. The home base monitoring station includes a computer system having a CPU in which is loaded data engine, display programs and web server or web browser programs to enable activation, operation and use by customers of the data system.

Each law enforcement person or other authorized tracker can access data on individual ones of the SMCs, totes and evidence items or groups of any of them, via a user name and password on an SSL server webpage. The tracker can poll where the container is, and the location provided by the container's GPS/GSM/GPRS/RSSI unit will be displayed on a map. In addition, in the case of an anomalous condition being sensed, such as: unauthorized unlocking; attempt at tampering, entry or opening of the container; unlocking at an improper location; sensing anomalous temperature, humidity, chemical conditions, unauthorized removal of evidence bags, removal of the wrong evidence bag or tote, and the like, the home base or web site system will wake up and emit an alarm, including audio, visual, sending of e-mails, faxes and phone calls, to a selected number and type of individual for response. The remote monitoring aspects of the invention provides a method for law enforcement personnel, defense counsel, prosecutors, and security/audit personnel to monitor from one or more "home" base(s), many containers, evidence bags, associated evidence items and totes simultaneously, the number ranging easily in the tens of thousands. Within the present system, the tracking personnel can be notified and check when anomalous events occur and can have a complete, verifiable evidence integrity and chain of custody report for each SMC from empty before loading to the courtroom, and with confidence in the security of the SMC and contained evidence along the route, including in the transport vehicle from its crime site origination to destination unload or storage.

The present evidence integrity system provides a unique identifier for each SMC, evidence bag, tote and associated evidence item that is RF tagged, in the field that is radioed to home base when the SMC is first put in use. Each SMC is pre-configured at home base (e.g., evidence department of law enforcement facility, or the like), or in the field, e.g., at the crime scene itself. As described above, the RF Zigbee/Bluetooth-type protocol reader reads the passive 1-IF or the active RF tags on evidence bags, totes or/and individual oversized evidence items as they are tagged and loaded in the SMC and provides a load (and later, and unload) inventory that is mapped to the location, time, and authorized key that opened (and then closed) the SMC; photos of the individual placing the evidence bags in the SMC are also taken and recorded.

After loading and close of the lid, upon locking the SMC reports its status, the time, or/and location back to home base on the predetermined timed cycle, (e.g., every half-hour, more frequently at night, less during the day, etc.), or to pollers (very short range, long-life battery powered microprocessor-controlled RF transmitters that are placed at various sites in the evidence van, in the evidence storage facility, the lab or courthouse), or by readers (long range, 100'-1500' depending on antenna) transceivers with the ability to receive and interpret the data from the container transponders, (e.g., as the van rolls by a road-side reader tower, and then forwards this information by wired or wireless communication to a computer or computer network for real time location and status data retrieval from the containers). The program at home base displays a map from the map program with each SMC or group of totes/oversize items located thereon with a unique icon, and the status can be indicated in text or change of icon, e.g., by animating the icon, changing color, flashing, change of text, combinations of each, and the like. In addition, an audio alert signal can be emitted on the computer speakers when the sensor(s) or lock detects an anomalous event or unauthorized; untimely, or wrong destination, attempts to open the container, etc. occur.

The present computer-based SMC evidence integrity system permits complete management of the SMC and evidence security during transport, storage, and delivery to the Court, as a business, including communication via the Internet of SMC/evidence status and event reports, orders, billing, e-mail communications, and the like. The net result is that the features of the SMC evidence integrity system permit true local and national evidence security capability, including user-friendly web-based operation, with capability to produce archival electronic and/or hard copy records of the entire evidence handling and storage, including a complete audit trail of SMC opening/closing activity, evidence bag inventory, by location, person, date and time.

The controller/sensor/RF/RSSI/GPS units are included in an electronics package that is preferably secured to an inside wall of the SMC, or in other convenient location. Customs or other security wires and seal systems may also be used for international shipping compliance.

It is preferred to include a loud, 80-120 DB battery-powered audio alarm system in the SMC electronics package. Preferably the alarm noise-maker is disposed in the front wall of the container behind a speaker grille that is covered by the lock plate. This alarm is activated by simple magnetic or button type contact switch elements in the lid and top of the box wall, respectively, or may be connected to the intrusion sensor, such as the screen insert or vibration sensor described above. The switch which arms or turns the alarm off is hidden behind the electronic lock cover plate. After unlocking the cover plate, the switch is accessible and must be turned off within a limited time, for example, 5-10 seconds, so the top can be opened.

The load/unload RF tag serial number data also can be loaded into the memory of the electronic lock key (or and the lock itself), so that upon relocking of the SMC by the electronic key, the key has the comparative record of load vs unload inventory. In an extension of this load/unload audit, the receiving location (evidence storage facility, lab, courthouse, prosecutors office, defense counsel) may have RF sensor/readers at selected location(s) on site so that the physical location of the tagged evidence is tracked while on site. Thus, the lab is fitted with a reader, and as the received evidence items are brought out for analysis, that on site reader adds the item to the local in-process inventory. In addition, the lab's reader can relay the log-in data via short range RF, e.g., 2-6 GHz transmission, to the RF transceiver of the SMC, and the SMC in turn can act as a relay to the evidence storage facility or prosecutors office, or suitable tracking authority (law enforcement agency, or the like) via its RF cell network VPN communications system. As withdrawals are made from the SMC by the lab, the RF tag information may be read and relayed as described. Thus, the SMC system provides a secure and comprehensive evidence tracking with provision for full handling and audit trail records.

MSCs are miniature wireless chips that currently have a 4 MB capacity of flash memory; greater capacities will soon be available. In addition, while current RFID/MSCs are silicon based, organic, printed RFID/MSCs are close to commercialization, and such types are included within the broad scope of a "tagged" or otherwise identified package. Indeed, the invention includes the provision of a scanner associated with the SMC to read bar code that may be used to identify packages, and the package bar code IDs are scanned (read) as the packages are loaded and unloaded, with the data being used as described above, by way of example.

BRIEF DESCRIPTION OF THE DRAWINGS

The invention is described in more detail by reference to the drawings, in which.

DETAILED DESCRIPTION

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention, including what is presently believed to be the best modes of carrying out the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing. All publications, patents and applications cited in this specification are herein incorporated by reference as if each individual publication, patent or application had been expressly stated to be incorporated by reference.

Figure 1:
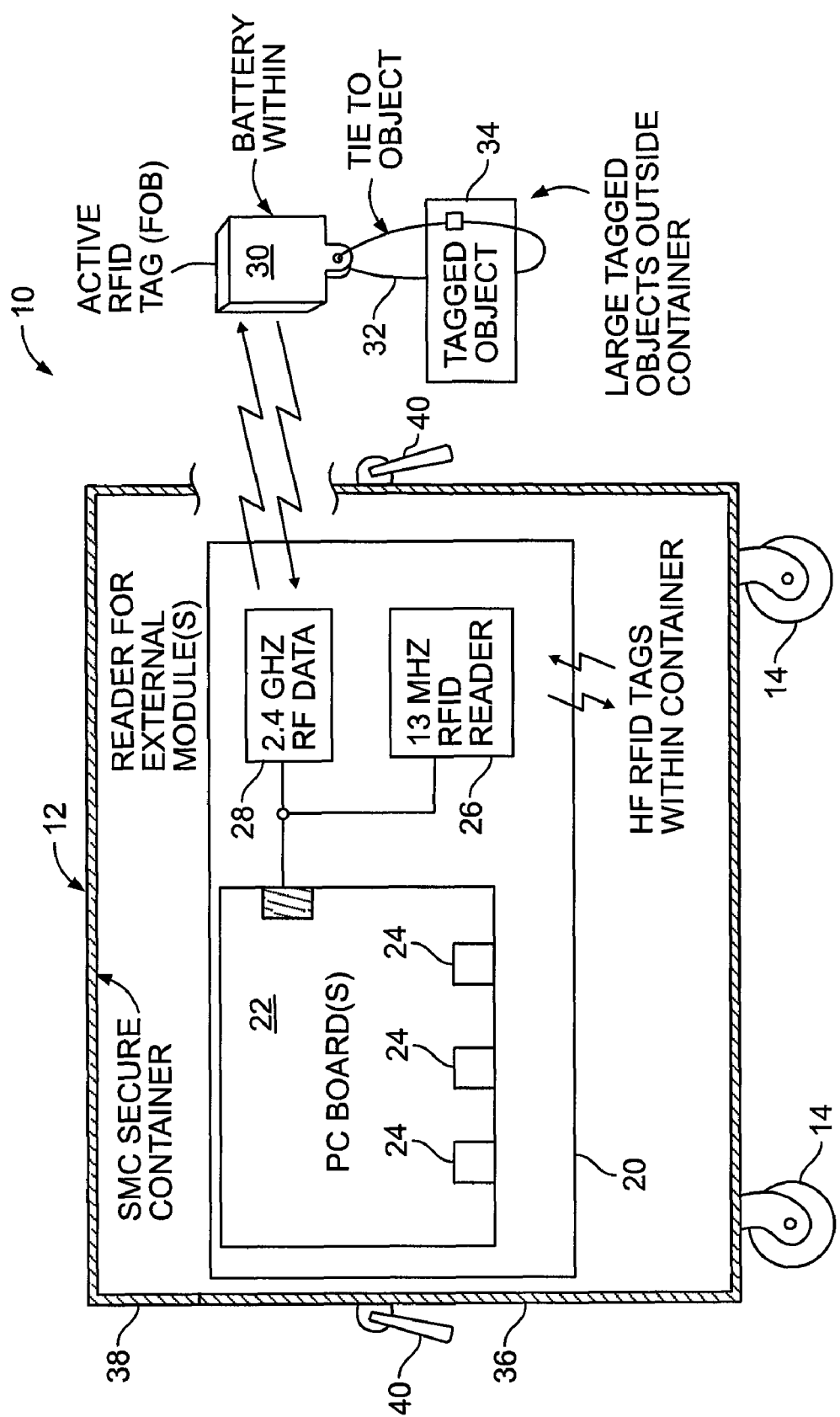
FIG. 1 is a schematic diagram of an SMC, its internal electronics package with HF and RF readers for both internal and external RFID tags.

FIG. 1 schematically shows the chain of evidence security system 10 comprising a secure smart mobile container (SMC) 12 having secured therein an electronics package 20 (described in more detail in connection with FIG. 5) that includes one or more PC boards 22, e.g. mother and daughter boards, and on which are mounted several sensors 24, and to which are connected one or more RFID readers, preferably HF reader 26 and RF reader 28. The HF reader reads HF-type RFID tags on or secured to individual items of evidence or evidence bags or containers (such as totes) that are stowed within the SMC 12. The RF reader reads higher RF frequencies of active RFID tags 30 that are secured to, e.g., via wires or ties 32) oversized objects 34 that are not stowed in the SMC 12. The SMC includes a body 36, a latchable and lockable lid 38, and casters 14 on the bottom for mobility.

Figure 2:
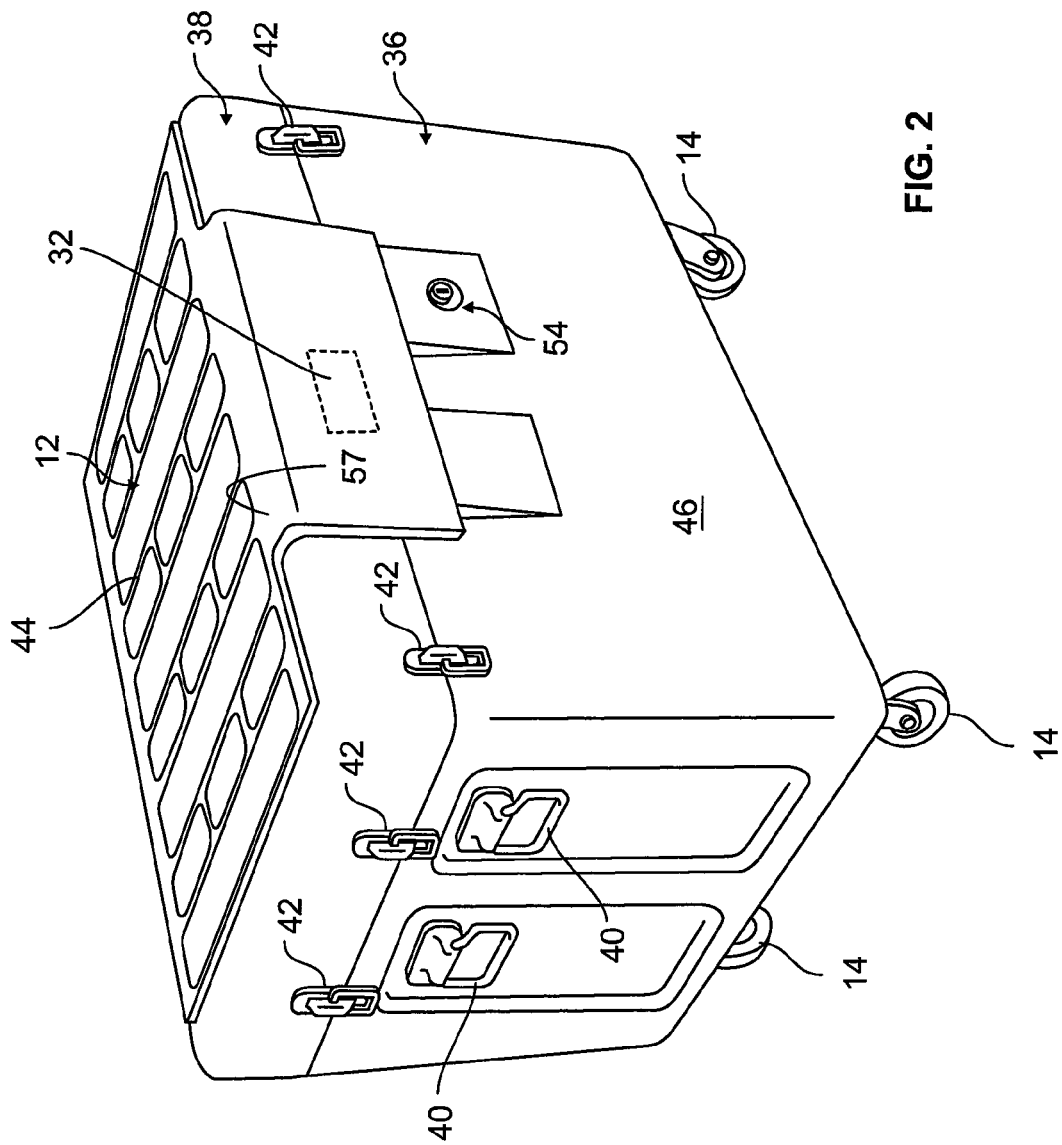
FIG. 2 is an isometric photo of a large SMC having casters.

By way of example, the SMC 12 may be any convenient size for transport of evidence. Preferably, the SMC containers are typically rectangular, having exemplary dimensions for the regular size as shown in FIGS. 1 and 2 on the order of 40" long×22"-33" wide×33" high outside dimensions and 37¼"×

19"-30"×25½" inside dimensions. These dimensions permit the SMC containers to fit through a standard entry/exit doorway opening of 26"-36" width. Since many interior doors range from 24-32" wide, a preferred width dimension of about 28" also permits the SMCs to be wheeled directly into most rooms. Some rooms are accessible only through 24", 26", 28" or 30" wide openings, in which case, as needed, SMCs having an external width dimension of less than 28" can easily be provided by adjustment of the container size. This preferred configuration is approximately a half standard pallet, so that one SMC placed front face to back or front face of a second SMC fit in the footprint of a standard pallet. However, it should be understood that the SMCs may be square, or smaller rectangles, e.g., standard pallet sized.

The presently preferred configuration of the SMC 12 comprises a molded polyethylene, e.g., HDPE, container body 36 and lid 38, and includes Water resistant neoprene seal on the inner periphery of the lid, a stainless steel lid exoskeleton 44. For the standard SMC 12 of FIGS. 1 and 2, the SMC includes a set of 4-5" polyurethane casters 14 secured to the bottom, two that lock and two that swivel. By way of example, the 4-caster standard SMC containers are typically rectangular, having exemplary dimensions on the order of 40" long×22"-33" wide×29"-33" high outside dimensions and 37¼"×19"-30"×25½" inside dimensions, at a weight of 140-160 lbs. These dimensions permit the SMCs to fit through a standard entry/exit doorway opening of 28-36" width However, it should be understood that the SMCs may be square, or smaller rectangles, e.g., the Courier-size SMC (see FIGS. 3A-3D) having two corner wheels and a telescoping handle. The Courier-size SMC has typical dimensions of: 22.5-29"×17.5-18"×11.5-13' and inside dimensions of 20-17"×16.5-17"×10.5-12.5" at a weight of 35-45 lbs. One significant feature of the SMCs is the provision of bottom-mounted wheels, either four corner-casters (standard SMC), or two fixed wheels (the smaller Courier size), that permit the SMCs to be loaded at the crime scene, rolled out and up ramps directly into the police evidence van, and permit the reverse movement at the destination end of the transit.

The body 36 may optionally include fold-down handles 40 on each side. With the casters, the top of the SMC is about 36" above the floor. A preferred electronic lock system 54 is disposed on the front side 46 and the lid 38 is prevented from opening by a flanged lock cover plate 56. The sealing of the lid to the body is assisted by latches on the sides and front by latches 42.

The presently preferred electronic lock 54 is a Nexgen hardened stainless steel lock by Medeco. The tracking electronics package 20 (See FIGS. 1 and 5) employs quad band RF GPS using GPRS/CDMA/SMS for communication by a Virtual Private Network over cellular telephone network towers (e.g., GSMIGPRS/GDGE), and an optional Global Satellite Communication unit. The tracking and sensor monitoring is done with a GIS Internet Software System. The internal, in-transit and in-storage power is provided by a rechargeable 18 Amp-hr, 12V battery pack and includes a charger having a transformer for connection to a 120V source. The sensor pack includes IR, motion/G-force, temperature and an optional photo-sensor.

It is an important feature of the system and method aspects of the invention that the SMCs are loaded and locked at the origination end at the crime scene, and not unlocked until the SMCs are at the authorized law enforcement storage location, the crime lab, the court, or the prosecutor's office for review and analysis, or ultimately for grand jury charging or trial purposes. Audit and tracking, optionally including condition status monitoring and/or location polling, that are verifiable by law enforcement personnel, prosecutors, defense counsel and the court(s) are significant features of present the system and method. Typically, for trial, an archival record is printed for verification and prove-up of the container and evidence security, including access at all stages, and trip route integrity during the transport processes. The criminal justice system gains an immense sense of security and verifiability when an authorized law enforcement personnel (person) locks the SMC at point of origin (e.g., crime scene, or premises search which may not be a crime scene), personally keeps custody of the authorization-to-open key for the duration of the transport to the evidence storage facility, and the key is then retained by authorized persons, e.g., prosecutor's office to maintain and control unlocking and relocking only for legitimate criminal justice procedures. The RFID logs in conjunction with the key audit and the GPS location log are persuasive of a complete chain of authorized custody and handling of the evidence only for legitimate purposes by authorized persons for legitimate reasons.

The SMC containers of the invention are robust. By way of example, the SMCs are constructed of any high strength material. Optionally the SMCs may be double walled with foamed in place urethane insulation between inner and outer layers. Preferred container materials include: high density polyethylene or polypropylene, or copolymers thereof; steel; aluminum; fiberglass; high strength homo-polymers or copolymers; composites; laminated or reinforced polymers (such as carbon, Nomex, Kevlar, and/or glass fiber reinforced polymers); high-density co-molded polyolyfins; polyolefin and aluminum or) steel honeycomb or corrugated (sinusoidal or angular in shape) laminates, such as polyolefin skins/aluminum honeycomb/corrugated core laminates, multi-layer woven fiber or fabric and aluminum sheet sandwich laminates; or any other available suitable rugged material, available at the present or in the future. It is preferred that an SMC is capable of carrying substantial loads, and is capable of withstanding the weight of at least two additional fully-loaded SMCs stacked on top of it, although stacking is not a preferred mode of transport or storage.

In the preferred embodiment, as part of the robustness feature, the SMCs include an exterior lid reinforcement structure 44 of fabricated steel, titanium or other hardened metal alloy strips, termed an "exoskeleton", that functions to provide: 1) structural, reinforcement of the plastic lid, and optionally walls and floor; and 2) fortification of the box against unauthorized entry for security purposes. Metal "flat" or strapping criss-crosses the lid and optionally align with vertical straps, channels, or sheets along at least two opposed vertical sidewalls (preferably the front and back end walls) of the box. The vertical side wall straps, channels or sheets extend to wide strapping under the floor. A front side includes an electronic lock mechanism 54 that unlocks a hinged, flanged lock cover plate 56, that pivots either up or down, depending on the SMC container configuration.

By way of orientation terminology, the side of the SMC that includes the primary locking mechanism 54, 56 is called the front, which is on one of the long, 40" sides in the preferred example. The back side is the opposite long side, and the hinge(s) for the single-piece top lid are located along the back side margin of the lid at the juncture with-the back side wall. The respective right and left side walls are the short sides of the SMC, in the preferred example from 24"-33" in length, the length being selected depending on the access door width of particular suppliers or customers that will use the SMCs. Of course, a size in the range of 28"-33" is preferred, so that with the lock assembly on the front and the hinges on the back, there is clearance through doorways. That is, when the SMC is wheeled (4 casters or the 2 wheels of the Courier container configurations), the long axis of the box is oriented in the direction of travel, so that the front and back are now the "sides" facing the door frame as the box is wheeled through a doorway.

A single panel, hinged top lid 38 is provided for the container, a set of hinges being located at the top of the rear wall. The lid in the open position rests in a generally vertical, but backwardly-canted position at the back of the container. The top is also armored with exoskeleton strapping 44 extending the longitudinal length of the lid and transversely across it. In addition, marginal vertical edge of the lid may optionally include a steel band for strength and security. The front of the lid includes slotted tangs that are engaged by one or more cam-type locks 42 on the front and side walls adjacent the top. The locks can also be snap type. The underside of the lid includes a wide seal strip (not shown), such as a double seal of neoprene or other sealing material, adjacent and all around the margin that is aligned with the side walls top edges of the container body 36. Thus, when the top is latched and locked, the seal strip is compressed providing a substantially hermetic seal between the SMC top and side walls of the body. The underside of the lid typically includes an engineered array of reinforcing ribs.

Figure 5:
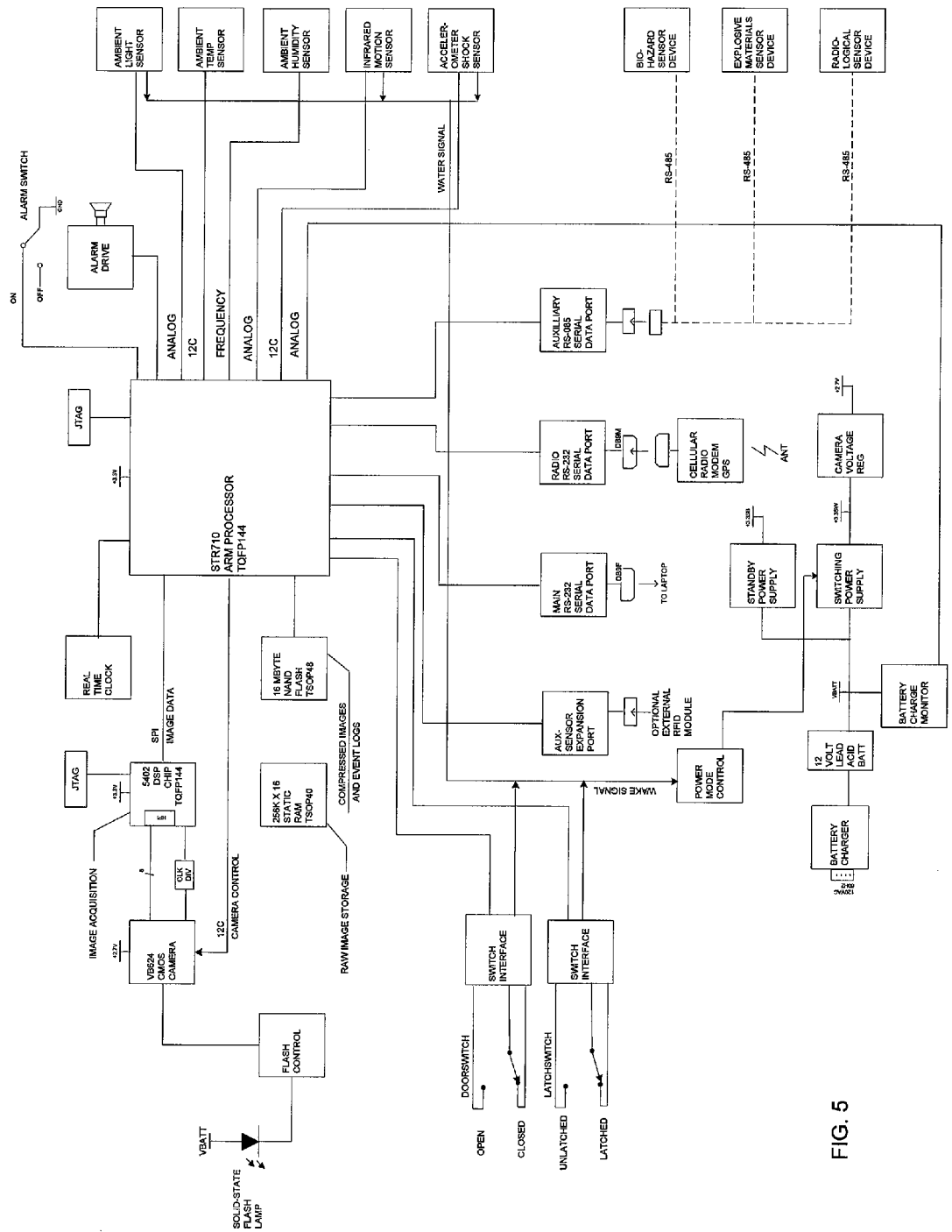
FIG. 5 is a block diagram of an exemplary configuration of the electronics package of the SMC containers of this invention.

Thus, together, the trackable location and call-home functionalities, the lock auditing and condition sensors of the embedded electronics package 20 of FIGS. 1 and 5 in the SMC evidence security system comprise a multi-layered intelligence system, providing monitoring, tracking and mitigation of condition, location and anomalous events, as well as a verifiable audit trail of all handling events. The result is total assurance of integrity of evidence, and assists in preventing misplacement of, tampering with, or theft loss of evidence. In addition, the SMC electronics package includes at least one RF tag reader, preferably using a communications protocol, such as a protocol like the 802.15.4 low level communications protocol, to read 13.6 MHz (HF) passive chips (tags), or/and 2-6 GHz active chips that are attached to integrated with on evidence bags or totes loaded into the SMC or accompanying the SMC for secure handling and storage. 900 MHz UHF passive tags are not preferred under the scope of this invention, as such frequency may adversely affect biological samples (such as specimens that may contain vital DNA and blood type evidence), and the reader for such tags require high drain power sources. In the case of 2.4 GHz active tags, the evidence specimens may be placed in metallized bags or totes, that is plastic (such as a plastic tote) that has been coated with a fine layer of metal (such as aluminum) to serve as a screen against the RF signal to prevent any damage to the contents. However, such metallized bag/tote packaging can be used universally, that is in all cases, just to ensure no RF effect on the contents. For most evidence specimens placed in standard evidence bags placed in the SMC, HF tags are secured to the bags and the reader of the electronics package 20 of the SMC can read the tags as the bagged evidence items are loaded and unloaded. Likewise, the active 2-6 GHz tags are preferable for use with biological evidence specimens and oversized evidence items, 2.4-5 GHz being presently considered the best mode, particularly when packaged in the aluminized RF-protective bags or totes. The frequency of the transmission is selected in a range so as to not affect the biological items, particularly when packed in the RF-protective bags or totes, defined herein generally as to not be a substantial resonant frequency of hydroxyl or amine radicals as measured in the bags or tote containers. The active RFID tags 30 (FIG. 1) employ an RF transmitter and battery in a unit the size of a key fob. Optionally, a wire tie can serve as an antenna. In that embodiment, if the tag or wire tie connecting it to the evidence object 34 is tampered with, the range is affected and the reader can loose contact. That loss of contact is time logged into memory of the electronics package 20 and shows up when either audited (via download) or when an alert is sent by the RF transmitter in the electronics of the SMC via the cell tower communication system to home base.

Figure 3A:
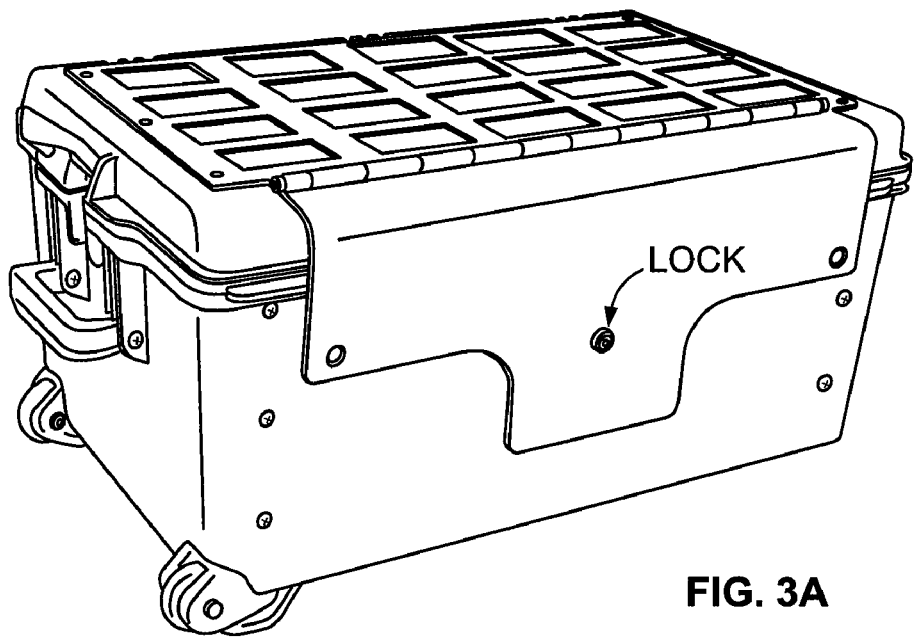
FIGS. 3A-3D are a series of isometric photos showing a Courier-sized SMC (FIGS. 3A-3C) having two wheels and a telescoping handle (FIG. 3D), and showing the electronic lock and lock plate, first in the closed; position (FIG. 3B), then in the open position (FIG. 3C).
Figure 3B:
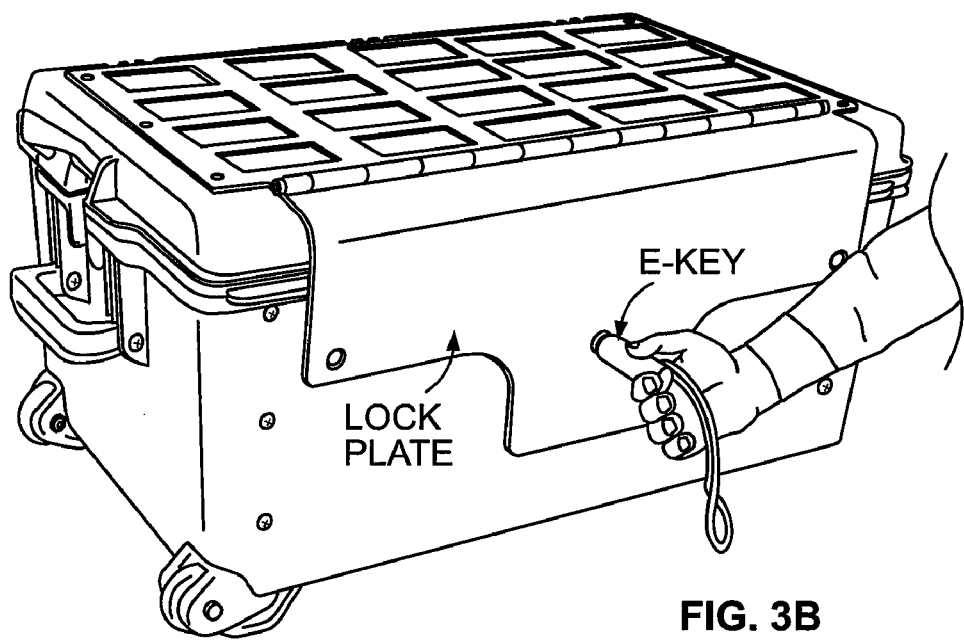
Figure 3C:
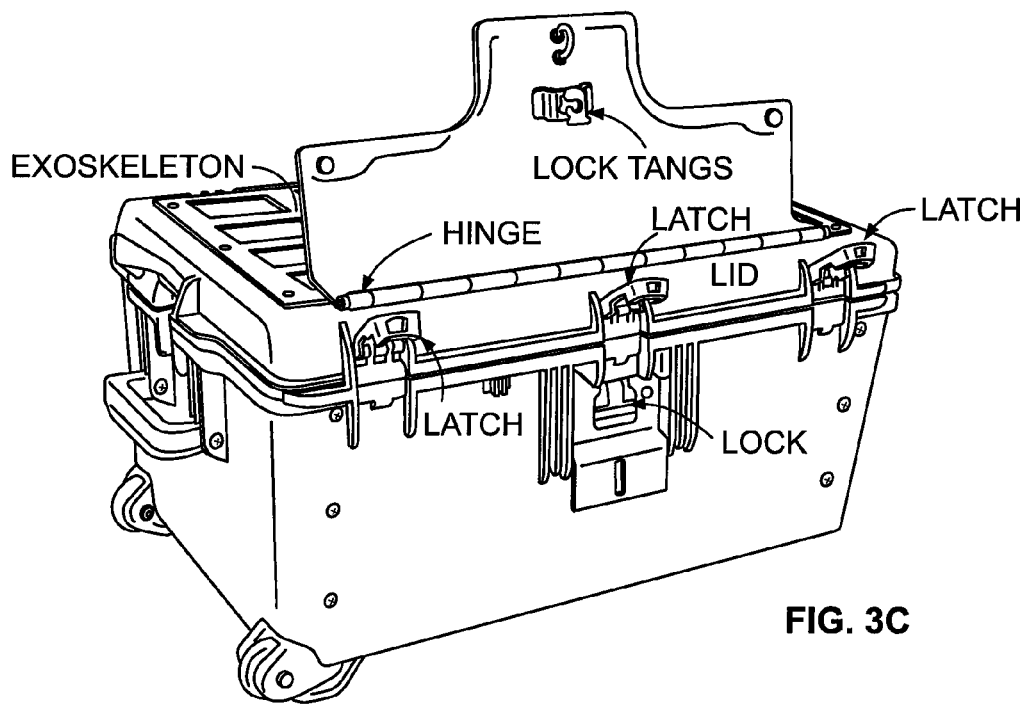
Figure 3D:
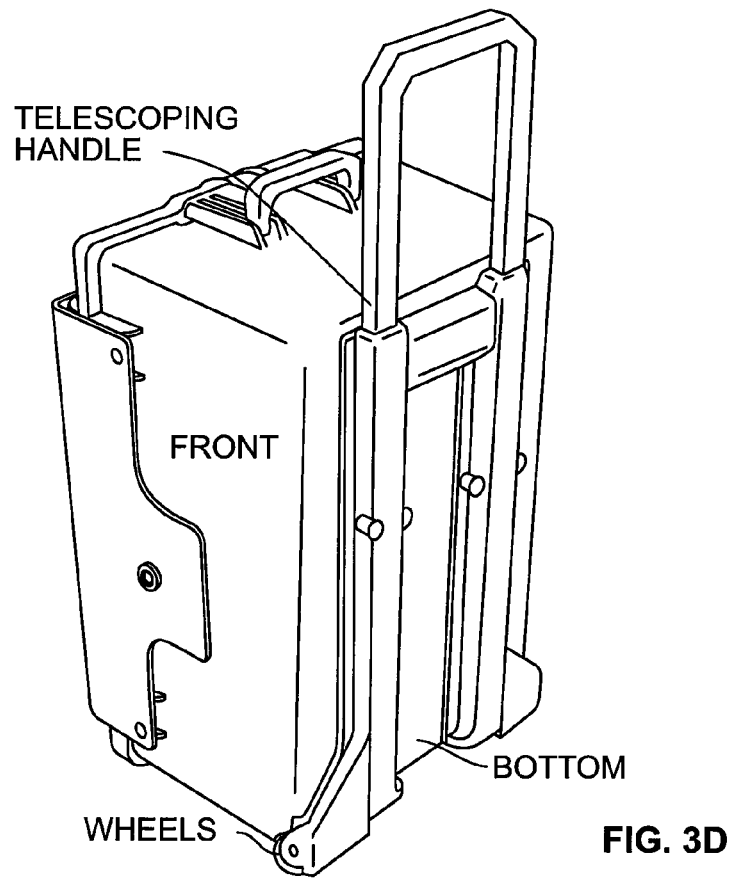

FIGS. 3A-3D are a series of photos showing the Courier-sized SMC container configuration, here a 2-wheel container having a telescoping handle assembly secured to the bottom end (as best seen FIG. 3D). The side facing in all photos is denominated the front. The lid exoskeleton is visible on the top. The wheels are seen at the lower end, left side in the photos and in FIG. 3D. A handle is also seen at the left end, and a similar handle is presented on the right end as seen in FIG. 3D. The L-shaped lock plate is seen in all figures, closed in FIGS. 3A, 3B and 3D and open in FIG. 3D. The lock plate is hinged to the exoskeleton along the upper flange marginal edge, and it folds up to reveal the electronic lock, see FIG. 3C in the middle of the front wall of the Courier SMC. In FIG. 3B the electronic key is used to engage the recessed lock contacts. In FIG. 3C the lock has been opened and the lock plate lifted up to reveal the three lid latches, formerly covered by the lock plate. In this figure, the lid latches have been opened. The container lid can now be opened.

In the preferred embodiment, each SMC can be loaded with on the order of 4-8 evidence totes, which are closable trays having side walls and lids, optionally lockable with the same or different electronic key, for containing evidence items or biological specimens. Each tote has its uniquely identified, addressable passive HF tag or active 2-6 GHz RF tag. As the totes are placed into the SMC, the reader of the electronics package 20 detects (over a range of 1-2" for the HF, or 20-50' for the GHz RFID tags, depending on antenna configuration, length and location) each tote and records the load or unload to memory. The tags are preferably coded to match the crime scene ID, the case ID, or other law enforcement unique ID system. Together the passive HF/active RF tags reader is able to provide a complete evidence item collection log, both for load at the crime or subpoena site, and subsequent analysis or examination "unload" log. In short, the RFID reader of the SMC provides an inventory log. Paired with the location data, and the key identification and authorization data and time, a complete picture of the who, when, where and what is recorded and relayed via the RF virtual private network in essentially real time to the appropriate personnel in the criminal justice system. This evidence collection and keep-safe record can be archived, accessed as needed, and provided in electronic or hard copy form to the Court(s) and appropriate counsel.

The SMCs, both embodiments, include hinged, L-shaped, flanged lock plate 56 that covers the opening side of the SMC lid 38. The lock plate covers a housing for an electronic lock 54. When raised, the lock plate completely covers the lock body and its connection to the electronics package inside the SMC. In a first embodiment, the lock plate includes a latch plate with a hole that engages the plunger of the electronic lock. In addition, the lock plate, when closed, covers a pair of spaced, cam or snap type lid locks 42. The lid locks enable the lid to be cinched down, hermetically sealing the lid to the box. The lid locks are also completely covered by the flanged lock cover plate. Thus, to resist tampering; there are no exposed parts that act as a purchase for a pry bar.

In a second embodiment, a smaller, Courier size container having only 2 wheels and a telescoping handle in a configuration akin to a large roll-away suitcase, shown in FIGS. 3A-3D, may be used for smaller collections of evidence items. It also includes the electronics package and functionalities described herein. In this configuration, the L-shaped lock plate is hinged adjacent the side wall edge of the lid, see FIG. 3C, so that it folds down. The lock mechanism is contained in the lock plate, and a striker plate having a hole there-through to receive and engage the male lock shackle mechanism is secured to the side wall of the container. The striker plate includes the lock contacts to complete the electrical circuit to the lock electronics contained in the electronics package inside the courier container.

In both container embodiments, the preferred lock system is a hardened electronic lock mechanism that permits identification of which "keyholder" (approved access-person or organization) opens the lock(s), when the lock(s) is/are opened, and how long the lock(s) stay opened, and, optionally; the location. The locks are hardened with steel shell, bolt and plug face. Each key and lock is uniquely identified, and there are virtually unlimited unique lock codes. The open/close time parameters can be pre-set, actual opening and closing times are recorded and downloadable, either by direct connection of the key to a PC, or by connection of the box lock to a hand-held device, such as a PDA, or the openings/closings can be radioed to a remote, home base. Thus, if there is an attempt to open that is outside the authorized time, an alert can be radioed to a monitoring station service facility or service provider. By way of example, a suitable electronic lock is the NexGen high security electronic lock, Model 65 series, or Pal-Loc model, provided by Medeco Inc. of Salem, Va., USA, a division of Hillenbrandt Industries, Inc.

The locks and keys are uniquely identified, mating and programmable, including both at a home base and in the field, and store several thousand downloadable access events to provide a full audit trail. The programming includes configuring the key to authorize its use to open one or more boxes, to select the time, and by integration with the RF transmitter, controller and GPS module in the box, the location at which the box can be opened or/and locked. Thus, the boxes can be both authorized-entry/unlock and destination restricted to prevent unauthorized keys or persons from opening and closing the container.

An important feature of the evidence SMCs is that each are integrated (complete), and highly tamper resistant. That is, there are no loose parts that can be lost during use or storage, and the material is selected for strength to resist both casual and relatively concerted theft attempts. The lock is integrated in the exoskeleton, the top is flex-pry resistant, and the communication module includes location and links to sensor systems associated with the SMC (embedded into, secured onto, or disposed in the SMC evidence cargo volume) to provide real-time state-of-the evidence data.

The standard and Courier SMC containers each have a lid that is configured with a mating lip groove and rib to prevent insertion of tools or unauthorized inspection devices. The lid lip is preferably provided with a substantially hermetic seal element, for weather tightness, security and to assist in the optional gas sampling evaluation of content integrity. This feature provides security for the investigating law enforcement agency and is of great benefit for proving verifiable chain of custody integrity and/or security for the evidence collected at identifiable sites. In combination with the lip seals, one or more port(s) is/are optionally provided for evacuation of the container, or purging of the container with an anti-microbial or anti-pathogen gas, or pressurized with a security gas (which may include an anti-pathogen gas) to protect or sample the contents, or to expose a thief to a lethal or sub-lethal, incapacitating or marking gas or other fluid upon unauthorized breach of the SMC walls or attempts to pry open the SMC.

The GPS or RSSI location tracking is activated, typically when the SMC is requisitioned for an investigation or at the crime scene or subpoena/search warrant site. The SMC location thus verifies where the evidence was collected, the time and date, and logs in the evidence bags or oversized evidence items. The photos taken by the CMOS camera and flash chip show the evidence item loading and the person responsible for the item collection, placement in the evidence bag and the loading in the SMC. Thus, the evidentiary chain of custody of each item is complete and verifiable.

Figure 4:
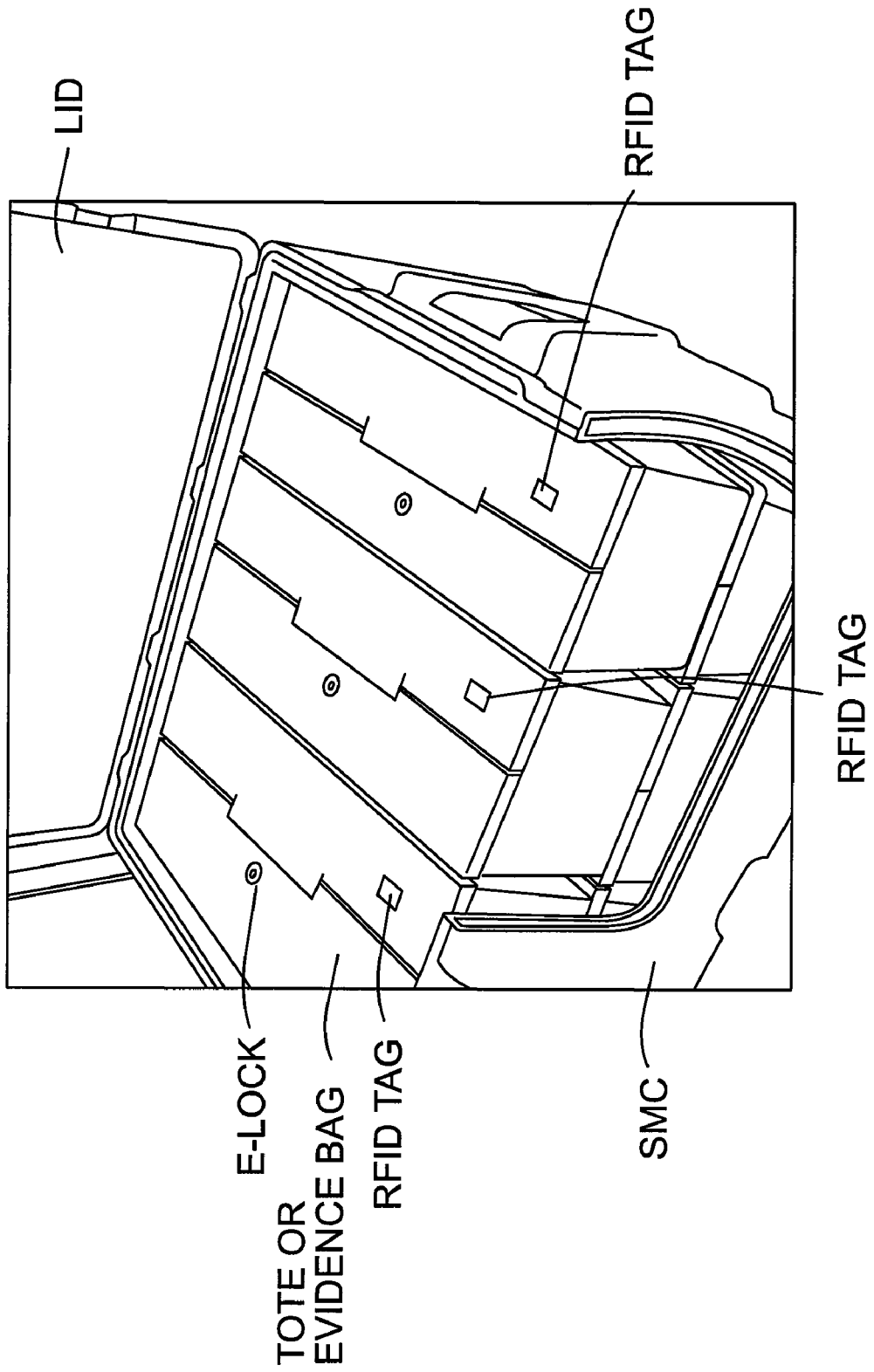
FIG. 4 is an isometric diagram, partially broken away showing an SMC in which 6 individual evidence totes, each having an individual RFID tag and a lock, are stowed.

FIG. 4 shows an SMC with the lid open, and the front and part of the right side wall broken away to illustrate, packing with, in this example, 6 evidence totes. Note that in this embodiment, each tote includes both an RFID tag and an electronic lock. Active or passive RFID chips are seen on the right side lid of each tote and are removed from the SMC, the reader in the electronics package of FIGS. 1 and 5 reads and records the removal for the evidence item load/unload inventory audit trail. Where desired, or for selected evidence items, the tote lids can be secured with electronic locks of the type disclosed. Thus, each tote would be required to be opened with an authorized electronic key, and the audit trail would extend to the tote, level of evidence collection.

FIG. 5 is a block diagram of an exemplary topology of the components of an electronics package for the SMC containers of the invention. Each component is labeled so that the diagram is self-explanatory and a complete depiction that is clearly enabling to those skilled in this art. Note the toggle switch is at the upper right, along with the 120 Db alarm. Just below is a vertical array of the standard sensors connected to the ARM processor. Additional biohazard, explosive and radiological sensors are listed next below, connected to the ARM via the auxiliary RS485 serial data port. The cellular radio modem is connected via the RS232 serial port, and an externally accessible RS232 port permits connection of a laptop, PDA or other device in the field for configuration, downloading of data, uploading of upgrades, and the like. The RFID module described above for reading the passive HF tags or the active 2.4 GHz tags is also provided and shown. The power components are shown below left, including the external recharge plug, batter, battery charge monitor, power mode control, standby power supply, and power switching. In addition, the power to the camera is shown, with the camera auxiliary (daughter) board being shown on the upper left, which includes an SS flash lamp, flash controller, CMOS camera, image acquisition firmware and DSP chip, raw image storage in static RAM, compressed image storage in NAND flash RAM. The lid open/close and latch open/close switches are shown on the left, center. The real time clock for logging events by time is shown top, center, and just below is the motherboard with ARM processor.

The electronics package of FIGS. 1 and 5 fits against the inner surface of the front wall of the SMC. Optionally but, preferably, a wide variety of sensors 24 are placed in the electronics package, or on the interior or exterior of the SMC top, bottom and side walls, or distributed inside the SMC cargo volume and hard wire-connected through a Molex connector on the RF/GPS unit. Optionally, and preferably, the sensors communicate the data outputs via short range RF to the unit 176 to signal the state, status or an anomalous condition. The sensors may be powered by the power supply as shown in FIG. 5. Optionally, the sensors can include their own battery power (typically small hearing aid, watch or camera-type disc batteries, or kinetic power units) that provide enough power for years of operation. The sensors can detect, among other conditions: intrusion; ionizing radiation and X-ray; sound; light color, contrast and intensity; ultrasound (US); infra-red (IR); electro-magnetic fields; current, voltage and resistance; humidity; pH; temperature, including absolute values, change and rate of change in temperature, including both external ambient and internal; motion, such as change of direction (inertial), acceleration and speed of travel; transient vibration, displacement, inclination and shock; pressure, weight, load and force, including absolute values, change and rate of change in values; and gases, fine particulates, fumes, chemicals and biologicals, by type and amount, such as gaseous CO, $CO_2$, $O_3$, $N_2$, $H_2$, or volatile hydrocarbons, e.g., smoke, propane or gasoline, explosives, Anthrax, Ricin, and Sarin, Chlorine, Bromine, Tabun, Soman, VX, Phosgene and Diphosgene, Chlorpicrin, Hydrogen Cyanide, Arsine, Agent Orange, or other immobilizing, irritating, incapacitating or lethal gases (including single components of binary, ternary or quaternary gas mixtures); and the like.

The sensors can be preset to sample parameters every one to two seconds up to once every several hours, and transmit updated and normal data in periodicity ranging from every 1-5 minutes or so to once per day, or only as changes or events occur. The periodicity and range of transmission may be adjusted to accommodate particular goods or conditions. Where there is no change, or the changes are within a predetermined acceptable range, the sensor can go into a sleep mode until the next programmed reading and transmission. In addition, the sensors can be polled and respond back with a reading upon request from the relay or RF/GPS or GSM unit to report.

As described, the sensors can be distributed in or on the SMC, or can be mounted on the PC board 22 of the electronics package control unit. The sensors sense conditions a predetermined value above or below a baseline value, compare and conclude that the sensed signal is an anomaly, relay that to the microprocessor in the controller which in turn further analyzes the information and packages it with other data from other sensors and the GPS system and radios it out. The RF transceiver is a transmitter and receiver that relays the information to a designated site, such as a home base or service company server, typically via a cellular telephone VPN or paging network (950 MHz, or other FCC designated frequency). Where the truck has a master GPS system (GSM), the RF transceiver in the box can radio to it, which packages the sensor data with its GPS then-location data of the vehicle, and relays that to the server.

The RF/GPS or GSM units can also be programmed to alert specific monitoring personnel, such as the prosecutor's office, or a law enforcement Internal Investigations Department tasked to independently verify evidence integrity. As a working example, consider a police department evidence storage department holding SMC evidence containers. In the event of an anomalous condition, such as vibrations in excess of a baseline are sensed, indicative of unauthorized movement or an attempt to breach the integrity of the container walls or tampering with the lock, the authorized monitoring personnel are alerted by both the audio alarm and by an RF message so personnel can make provisions to correct the situation. Likewise, the monitoring inspector can poll the SMC to determine the current status and the history of the SMC condition and location, as well as the authorized key opening/closing log to determine if there has been an anomalous condition, location or access at any time.

Short range RF (wireless) sensors of the type useful in the smart container system, having frequencies in the range of from 308 to 916 MHz and a battery life of 3-5 years, are available from Radio Data Corp of Scottsdale, Ariz. The RF sensors communicate via a sensing transponder (or the transponder has its own on-board sensors) as well as being able to receive transmissions from a Radio Data Corp Universal Sensing Transmitter (USST) and other external wired sensors or status indicators. One embodiment of the present invention also includes a micro-controller, a 916.5 MHz transceiver, a flash memory and a real time clock (for data storage) and either an RS232/485 interface or a USB interface. The microcontroller can either connect directly to a GSM, GPS/GSM or GPRS unit or it can communicate using the 916.5 MHz transceiver to a reader that can have an 802.11, 802.15, 802.16, GSM or other global communication link. The transceiver can also be used to send local alarm signals to a Radio Data Corp Key Fob Alarm that can be worn by the driver or attendant, thereby paging them. The transponder is a collector of multiple sensor transmitter signals and the reader is a concentrator of multiple transponder signals. Radio Data Corp also provides a Key Pad Poller which allows manually coded transmissions (or instructions) to be entered into the system via either the transponder or the reader (like a parking space or loading dock number) or it can be used as a load or door status indicator.

An example of an RF/GPS unit of a type useful with the controller 176 in the smart cargo containers is a PADTAG unit available from PAD, Inc. of Longvalley, N.J., in which case the RF transmission is sent to and received by a paging or reflex network (950 MHz), and routed to a base station server. Each shipper, customer or other authorized tracker can access data on each of the SMCs, the totes, or groups of either via a customer or user name and password on an SSL server webpage. The tracker can poll where the SMC/tote is, and the location provided by the container's GPS/GSM/RSSI unit will be displayed on a map. In addition, in the case of an anomalous condition being sensed, such as: unauthorized unlocking; attempt at tampering, entry or opening of the container; unlocking at an improper location; sensing temperature, humidity, chemical conditions, and the like, the system will wake up and emit an alarm, including audio, visual; sending of e-mails, faxes and phone calls, to a selected number and type of individual for response. The Radio Data Corp wireless sensors can be mounted on a Radio Data LIT-MIS daughter board mounted on the PADTAG controller board. An example of a commercially available GPS unit is an Earthmate GPS LT-20 unit, available from Delorme (delorme.com), or similar units from Garmin, Magellan, Lowrance and Philips.

It is preferred to include a 90-120 Db audio alarm .system-in the SMC. As seen in FIGS. 2 and 5, battery-powered 90-120 DB audio alarm unit is disposed in the front wall 34 (and/or any 30 other wall of the SMC) just behind a speaker grille. This alarm is activated by simple magnetic or button type contact switch elements in the lid and top of the box wall or interposed between the inside face of the lock cover plate 56 and the lock housing, respectively. A toggle switch, see FIG. 5, arms or turns the alarm off. If the lid is opened or the lock cover plate is moved (raised or lowered, as the case may be) the alarm sounds. A delay of a few seconds can be provided in a conventional manner. In use, after unlocking the cover plate 56, the switch is accessible, and is moved to the off position. Then the top 38 can be unlatched via lid latches 42 and opened. The circuitry is straight forward for the audio alarm, its battery, the NC magnetic switch, and the toggle switch, based on the principle that when the circuit is broken the alarm will sound.

The lid latches and/or alarm toggle switch can be replaced with a biometric switch, comprising a biometric scanner (e.g., finger print or retinal scanner), comparison logic and solenoid latch to permit shut off of alarm or container or tote lid opening, if desired.

It should be understood that a red LED can be part of the audio alarm circuit. Where two red LED's are used, when both are illuminated, it means both the RF/GPS system and the audio alarm system is armed. Instead of two red LED's, different colors may be used, (e.g., red for the RF/GPS system and blue, white or yellow for the audio alarm.) In other embodiments, the SMC container may include a number of externally visible status or condition LEDs, the function of which is signal status including at least one of an armed condition, an open condition, a battery low condition, an attention-required condition, a wrong location warning, and a breach or damage condition.

By way of example, a suitable electronic lock is the "NexGen" electronic high security lock system, available from Medeco Inc. of Salem, Va., USA, a division of Hillenbrandt Industries, Inc. The NexGen electronic lock provides access control, audit capability, route management and the physical security of a high quality mechanical lock. No hardwiring is required of the lock because it derives all of its power from the programmable key, which is battery powered to last for up to 6,000 or more audit events. The software system permits the user to program into the key, authorization who may open the lock and when they may do so. Both the lock and the key may contain event memory, minimally the key and preferably both. Upon download of data from the key or/and the lock, the software program provides detailed reports for complete security management, including all openings and attempted openings. Because the keys are electronically reprogrammable, locks and keys can be immediately re-keyed to replace lost or stolen keys. A single key can access up to 11,000 differently programmed locks, and each lock can store up to 2,000 audit events. While the electronic keys are currently available in four different styles, each is designed to be able to open T-handle cylinder, cam or padlock style locks. In the instant SMC evidence container, the T-handle type cylinder lock is preferably employed with the cylindrical, round end, handle-type key.

As seen in FIG. 3B (in the hand) the programmable electronic key includes spring-biased protruding pin-type electrical contacts which signal lock 54 (FIG. 2) when the properly programmed key has been inserted in the key contact plate (also known as a "plug face") to align with the respective shallow recess contacts in the lock. As described, when electronic "recognition" between lock and key has occurred, the green LED lights-up, and when there is unauthorized attempt, the red LED lights-up. The key includes a flat face with a plurality of contacts for proper orientation of the key in a key programming cradle for configuring use authorizations and audit trail downloads of the electronic key of the SMC evidence container. The key of FIG. 3B is placed in a cradle with programming contacts on the underside of the key aligned with programming contacts located in the cradle. Programming is performed using a PDA, tablet computer, laptop or desktop computer. LED lights on the key, one red and one green, light when the programming is in process (red) and complete (green). Alternatively, the programming can be done by use of a hand held PDA or tablet computer. In addition, the red/green LEDs can be amber/green or any other color combination, and can indicate the key is downloading the accumulated data from its memory and download complete, or the like suitable code.

The electronic locks have a hardened steel shell (the body, bolt or plunger, release T-handle or head and plug face), and the keys electronically record in included memory (for example, flash memory) on the order of thousands of separate auditable events, including at least one of: opening attempts; failure to open; positive open events; time of event; and the duration that the lock is in the open state. In addition, the keys can be programmed at home base or in the field by laptop, PDA, cell phone (including Blackberry or Sidekick) and the like devices, and the programming configuration code can be provided from a remote center to the programming cradle driving device (laptop, PDA, cell phone, etc.). The keys can be programmed to open locks only within specified time or location parameters. Each key is uniquely identified, both electronically and by bar code strip on the side or face of the key, so that each can be issued on a restricted basis to only authorized personnel, and can be accounted for. When the key is inserted in the lock, the lock memory can download to the key, so that upon inserting the key in the programming cradle the lock history data can be downloaded to the computer system for analysis and reports.

The electronic keys useful in the SMC need not have physical contacts as in the above described, non-limiting example, but may be activated via an RF proximity-type system to provide the key/lock recognition/authorization functionality permitting the key to be rotated in, or otherwise open, the lock. In addition, the lock may contain within its body or within the housing a flash memory to record a wide variety of events related to the lock, such as the ones enumerated for the key, or the condition status of the box.

In another alternative embodiment, the GPS/RSSI unit is incorporated in, or electrically connected to the lock or the key to provide a second level of access control, in that the lock is programmed so that if it is attempted to be opened at other than a pre-determined, pre-programmed destination, the lock will not open. Thus, upon the key being inserted in the lock, the then GPS coordinates are checked and compared to the programmed location in the memory of the key or lock, and if the coordinates compare, the green LED lights or flashes and the lock can be opened. As in the above example, if the coordinates do not compare within a pre-selected margin of error, e.g., within the accuracy of the GPS unit (within a few feet), the lock will not open. In either event, the history record will be stored for future download, or real time reporting by RF, e.g., Pager, Cell Phone, Bluetooth or other wireless network. Thus, the unauthorized event can be reported in real time to on site, nearby local, regional or distant location, by direct RF, or via RF to a local WAN or LAN wireless (e.g., 802.11-type) router that communicates via the Internet to a server at the shipper's, customer's, or security service (including governmental, military or law enforcement) headquarters or service center for appropriate action.

Verification integrity of evidence collection can be significant in the context of chain of custody of evidence. The first on scene crime responder carries a GPS unit, and identifies the location of the crime scene, body, wreck, fire, etc. The evidence department of the PD records and loads it into an SMC to be dispatched with an evidence tech to the scene. There is no chance the evidence tech, can go to a different location and commingle unrelated evidence, because the SMC will not open as it is not in the proper location. In addition, the GPS record of position (route) that the SMC took between the evidence lab and the scene will be recorded so that any detours will be noted. In addition, it is preferred that the SMC comes pre-packaged with a number of evidence bags, each of which has an RFID tag that is loaded into memory, of the SMC. The SMC is locked so that the evidence bags are locked. Thus only the authorized and tagged evidence bags can be taken out of the SMC, and only at the crime scene, and the SMC will record the opening location, time and authorized key doing so, and the RF reader will record the removal and replacement of the evidence bags back into the SMC. In reverse, the SMC will be locked the location, time and authorized key recorded, and the trip back track will be available in both real time and in an auditable report.

The internal electronics package of FIGS. 1 and 5 is secured to the inner face of the front wall of the SMCs of FIGS. 1-4. Typically there is no need for a face-plate covering between the mounting flanges on the left and right edges (mounting screws are seen in FIG. 3B to the left of the lock cover plate) since that face is against the inner wall of the SMC. Optionally, a laminated expanded metal screen plate can be used to cover the e-package housing.

The following provides one example of steps that can be used to implement the present evidence security and chain of custody integrity system, as shown by way of crime scene evidence. The same process can be applied to non-crime scene evidence, e.g., evidence recovered as a result of subpoenas or search warrants. At the crime scene, evidence is gathered. The evidence can immediately be tagged and/or placed into totes which have an RFID tag associated therewith and then associated with a specific SMC. The specific SMC is then transferred to a crime lab and/or to other locations for storage. The specific SMC can then transferred to Court for use of the evidence during a proceeding, and then ultimately stored for a period of time. The evidence is tracked throughout all transfers and throughout the entire time that the evidence is stored.

For example, in one embodiment, the method can include the following:

1. SMCs are provided in police department (PD) inventory in a locked condition, stocked with a selection of evidence bags or totes having short-range passive WHF RFID tags and with oversize item, longer range active RFID tags (in fobs). The SMC is hooked to PD power; if it is unplugged, the battery condition sensor alerts the staff when the on board batteries are low, via audio alarm and RF alert to the PD monitoring staff.

2. Responding officer reports a crime at a scene. The scene GPS location coordinates are automatically transmittal to headquarters along with the officer's call in, officer requests Evidence Dept to provide one or more standard or courier SMCs (optionally with totes) and scene photo shoot.

3. The police department's evidence department enters GPS coordinates into the SMC and the SMC ID (bar code or RFID of the SMC and contained totes/evidence bags and active tags are logged into PD database. The SMC's GPS will turn on the e-lock body only when the GPS coordinates match within a pre-configured range (range set by police department staff or as an SMC GPS default value). The SMC will not open until it is at the crime scene. An evidence technical employee (ET) is given a limited authorization e-key for that SMC/totes.

4. The ET takes the tasked SMC to the crime scene; photos are taken by police department crime scene photographers. Upon location match, the ET can open the SMC with the e-key at which time the ET's picture (sequence) is taken by the CMOS camera and flash chip on the electronics package of the SMC. Pictures are saved into SMC memory and RF-communicated to headquarters. As evidence bags are removed, the HF tags are read and II) data is saved into SMC memory, all the while being communicated in real time to PD headquarters via the SMC RF link. As bags/totes are loaded with evidence items and replaced, the inventory log is updated, as it is for the active RF tagged oversized items as well.

5. If out/in bag/tote (unload/re-load) and oversize fob RFID inventory at the scene does not match, that fact is logged and saved into SMC memory, and communicated automatically to PD headquarters where it is saved to an archival file.

6. If there is no RFID tag log match upon completion of evidence gathering, then in the attempt to relock the SMC with the e-key, inventory error warning LEDs on the SMC light up (there is an optional audio alarm), indicating all evidence bags are not accounted for. Missing bags are located and placed in the SMC, whether empty, unused or having evidence items in such bags. The SMC is relocked with the e-key; and again a photo series is taken by SMC/CMOS and flash chip camera. At least the time, location, and key ID are logged in the SMC/lock memory, and in key memory, as well as communicated to PD headquarters. The RFID sensing can trigger a photo being taken, or the CMOS camera can be programmed to continuously take photos at predetermined timed intervals throughout the entire evidence gathering process.

7. The site-relocked SMC is transported, along with tagged oversized active RFID items, to the PD's evidence department. If oversize items are separated from the SMC by more than 20 feet, that is logged, the SMC on-board audio alarm sounds, and data of that separation/loss of signal event is sent to the headquarters. This reminds the ET that all evidence must stay together.

8. Upon arrival at evidence department, the SMC containing the evidence bags or/and totes and oversized items are electronically logged in. Unlocking authorization may now be transferred to another key, held by the department supervisor or other personnel. This function is configurable via the key software.

9. For evaluation and discovery process, individual keys for individual totes in the SMC are issued and all handling is logged.

10. One or more trial handling key(s) is/are issued to the prosecutor's office. The trial court or other tribunal GPS location is entered into the SMC so that it (and totes) can only be opened with location match. The SMC photo series process still operates with on-board and real time archival log kept at PD headquarters. A hard copy and/or electronically accessible log of the evidence handling is available to the Court to assist it in handling any chain of evidence integrity disputes. The Court has a strong, comprehensive record to back up a request that the parties stipulate to the integrity of the evidence, thereby saving valuable court time and costs of prove-up.

Additional standard evidence handling/check-out procedures for lab/expert/defense attorney/prosecuting attorney can be used to supplement the above SMC—based handling procedure. In sensitive cases, the SMC/tote keys and locks can be programmed only to be opened by Police Department or Prosecutor's Office in presence of the defense attorney, or vice versa (a dual key procedure).

The present evidence chain of custody integrity system of this application has wide applicability to the criminal justice field, namely to verification of law enforcement personnel collection of evidentiary items, the transport to secure storage, the handling by various law enforcement, prosecutor and defense counsel during discovery and pre-trial, and the handling during and post trial. The system clearly provides the ultimate in security, integrity and tracking along with a verifiable audit trail. It also can provide a detailed load/unload inventory via evidence-item-specific RFID/MSC tags. The electronic locks and key system provides highly secure, auditable security that is viewable in real time via the GPS/RSSI locator system. Thus, the present system has the potential of becoming adopted as a standard for securing, tracking, and providing an auditable chain of custody for handling and storing evidence.

The present system includes the use of MSC spots or low frequency (13.6 MHz) or 2-6 GHz frequency RFID tags that are applied, encoded and read at normal evidence handling speeds during evidence collection and lab analysis, to assist in verifying the authenticity and integrity evidentiary items along each step in the criminal justice process. Thus, the present system provides an additional layer of security to lessen the chance of evidence loss or mishandling, not only in tracking at the evidence container (SMC) level, but also by RFID tracking down to the individual evidence item level. Such RFID/MSC encoded tracking and ID data will improve efficiencies and integrity of the evidence collection and storage process. Barcode may be used as complementary and redundant evidence bag and SMC ID and tracking data sources.

Prosecuting Attorney's Presentation of Evidence

When evidence is used in Court, a witness is typically needed to testify as to the chain of custody of the evidence, from the crime scene to the courtroom. This can be done through the testimony and/or through the submission of supporting documentation. The following provides one example of how the testimony of such a witness may read using the present invention:

The evidence submitted today was under the control of the Evidence Integrity System, referred to as EIS. The following documents show the control over the chain of custody for the evidence from the crime scene through analysis at the lab.

The evidence was collected by officer [X]. When he collected the evidence at the crime scene, he placed it in a bag, which has a trackable tag on it.

The following photographic record, which is dated and time stamped [Y] shows officer [X] placing the bag of evidence within a container that tracks the bag, as shown in these documents. The container is also tracked, as shown by these documents. The container was taken by the officer to the police department, as shown by these documents. Specifically, the following documents show the date and time of when the key unlocked the container, the dated and time the container lid was opened, the date and time of what bag and item was placed in the container, and the date and time of the container being closed and locked. The documents also show the date and time of each position change of the container, tracked by GPS location of container, starting with the verified GPS location of the crime scene. This GPS report also shows the path the evidence traveled to the crime lab at an [Z] minute interval. It arrived at the crime lab and it never left the jurisdiction.

Next, the container was opened at the crime lab. The documents show the time and date the container was opened, and that this specific item of evidence was removed for testing and safely returned to the container.

The documents also show that at no time did the internal temperature of the container exceed a temperature that would cause any detriment to the evidence, such as increased degradation. The documents also show that at no time did the internal humidity of the container exceed a humidity that would cause any detriment to the evidence, such as increased degradation.

Finally, I have a photographic record that officer [B] was at the crime lab and in control of the contents throughout the entire collection process. These documents prove control and proper handling of the evidence submitted here today.

The documents referred to in the above mock testimony proving chain of custody can be reports generated by the EIS. These reports allow a prosecuting attorney to more easily show chain of custody for evidence and more easily prepare for a case for trial.

Mapping Interface and Container Evidence Tracking

Referring to the Appendices, incluf The central server of the EIS includes a tracking software application for performing various tracking functions in connection with the tracking data received from the SMCs. Specifically, the tracking application can receive identification of various locations or points, as shown within the attached Appendices, which in the present invention can at least be the crime scenes or locations where evidence is received into a SMC. These points can also be the location of a crime lab, the location of police station and other locations within the chain of custody of the containers and evidence.

Three Appendices are attached to the present application for a better understanding of portions of the present invention, as follows:

Appendix 1—Tracking Services User Manual

Appendix 2—Laptop Utility Manual—Sensor Configuration

Appendix 3—Technical Manual

Referring to at least Appendix 1 (Tracking Services User Manual), points can be created and maintained for use in mapping functionality of the present invention. Points can be created for use within a real-time map. Each point can have a colored circle surrounding an icon image, and can be referred to a geo-fence or radius. The geo-fence can range from 500 feet (default) up to several miles in diameter. When the container is outside of a point's (container's) geo-fence, it has a "leave" status, which indicates that the container is not at a pre-defined location. When the container/controller sends a latitude/longitude location that is within that geo-fence, it has an "arrive" status. The arrive/leave status history is stored with the evidence log or activity report.

Creating points within a map can be performed is various ways. For example, in one embodiment, the tracking application can be configured to allow a user to right click on the exact location on the map for the new point. A red tear-drop image can appear on the screen. The user can then click on that image and a window can appear that allows the user to enter a point name. Points can be saved as permanent or temporary, or can be removed as well. To save the point in the point database, the tracking application can configured to allow the user to type the name of the location and click on a "save point" button. A point can then be edited from the an options menu after accessing the existing point therein.

Points can be viewed in a points interface screen. To view the Point on the map with its proper icon image, a user can click on a refresh button. The points interface screen allows a user to create and maintain addresses for repeat destinations, such as crime scenes, crime labs, police departments, court houses, offices, and other routine stops for evidence. These locations can be called Intelli-status points. In one embodiment, a user can add Intelli status point by clicking on a new button, which can be displayed in the lower left corner of the screen near a points list window. A points maintenance edit window will open in which a user can enter new information.

Te following data entry fields are available for points:

Point Name—Type the name or identifier of the new Point that is being created in this entry field.

Notes—This data entry field allows for any information you choose to include with this Intelli-Status Point. This may include phone numbers, contacts, or any other relevant information.

Point Type—This entry box is a drop-down menu that allows you to select the icon image that will represent this Intelli-Status Point on the map.

Address—Enter the street address for the new Point here.

City—The city name is entered into this box.

State—Enter the state in this entry box.

Zip—The related zip code can be entered into this box; however, the program will assign the correct zip code if this field is left blank.

Latitude—This information will be completed by the system.

Longitude—This information will also be defined and entered by the system.

Radius—The radius is the distance in feet or miles from the center of the Point. This is called the "Geo Fence" and defines an imaginary fence around the Point that allows the software to capture arrival and departure from defined locations. The smallest effective size is 500 feet.

Country—The two countries available for Point creation are the United States and Canada. The default is the USA. You must select Canada for any Canadian address to be recognized.

After entering the point name, address, city, and state, a user can click on a locate button in the lower left corner of the entry screen. The tracking application will automatically verify the address as valid and fill in blank fields, attributing a latitude and longitude to the location. If the address cannot be verified, a user will need to ascertain the location and move the point to the correct location.

A user can view actual points by clicking on a view map button to view the actual point location on a map screen. A red dot can represent the newly created Intelli-status points. If the dot is not at the correct location, a user can move the cursor to the correct location on the map and double-click—the system will then re-adjust the location. If a user wishes to change the radius of a point, the user can enter the desired radius into the radius field on the top bar, and select feet or miles as appropriate. When the location is correct, a user can click on the select button (√). The longitude and latitude will be corrected for this new location and the point maintenance screen is re-displayed.

If a user does not which to save any changes to the location, the user can click on the close button to close the map screen without saving any of the location changes. The point maintenance screen will reappear. A user can then click on the save button in the lower portion of this screen. The new Intelli-status point will then be saved and added to the points database. The point will also display on the real-time map screen (after clicking on the refresh button). If a user does not wish to save a point, a user can click on the cancel button and the point information will not be saved. A user can view previously created location points at any time. The points will display in alphabetical order. If a user wishes to change or redefine any information of a point, a user can right-click on an edit button while next to the specific location point. The point maintenance screen will then display. The entry screen can then be used to re-define a point.

If a specific location is no longer relevant to the operation, a point record can be deleted. To do so, a user can right-click on an edit button while next to the point to be deleted, and a the point maintenance screen will display. A user can then click on a delete button. A window will pop up asking if the user is sure he/she wants to delete the record.

Additional description relating to mapping and tracking of points, such as containers having evidence therein, can be found within at least Appendix 1. One of ordinary skill in the art would further understand how to implement the present invention with reference thereto.

Additional description relating to configuring sensors used within containers of the present invention, such as containers having evidence therein, can be found within at least Appendix 2. One of ordinary skill in the art would further understand how to implement the present invention with reference thereto.

Additional description relating to the containers of the present invention, such as containers having evidence therein, can be found within at least Appendix 3. One of ordinary skill in the art would further understand how to implement the present invention with reference thereto.

It should be understood that various modifications within the scope of this invention can be made by one of ordinary skill in the art without departing from the spirit thereof and without undue experimentation. For example, the SMCs can have a wide range of designs to provide the functionalities disclosed herein. This invention is therefore to be defined by the scope of the appended claims as broadly as the prior art will permit, and in view of the specification if need be, including a full range of current and future equivalents thereof.

What is claimed is:

1. A method of tracking custody of evidence using a portable evidence container comprising side and bottom walls forming a unitary container body and an internal space for receiving the cargo; an openable lid hinged to the container body for engaging tops of the side walls; means for locking the lid to the container body for preventing the lid from opening; and, an electronics module disposed within the container, the module having a controller, a battery supply unit connected to and supplying power to the controller, an RF transceiver unit in communication with the controller, an RFID reader in communication with the controller, a plurality of condition sensors disposed within the container and in communication with the controller, and a locator unit in communication with the controller, the method comprising the steps of:

providing for receiving at the controller through the RFID reader a unique evidence identifier from an RFID tag associated with the evidence;

providing for receiving at the controller through at least one of the condition sensors an evidence in container signal;

providing for receiving at the controller a portable container location signal from the locator unit;

providing for transmitting evidence information, evidence in container information, and container location information to a central computer system for tracking the status of the evidence within the container; and, providing for periodically transmitting an updated container location information to the central computer system for continuous tracking of the status of the evidence within the container.

2. The method claim 1 further comprising:

providing for receiving at the controller a container condition signal different from the evidence in container signal, representative of a condition of the portable evidence container.

3. The method of claim 2 wherein the condition is selected from a group consisting of internal temperature, internal humidity, shock to the container, lock status, lid open status, and visual status of the evidence.

4. The method of claim 1 further comprising the steps of:
providing for receiving at the controller an internal temperature signal from a temperature sensor disposed within the container and in communication with the controller; and,
providing for transmitting temperature information to a central computer system for tracking the status of the evidence within container.

5. The method of claim 1 further comprising the steps of:
providing for receiving at the controller an internal humidity signal from a humidity sensor disposed within the container and in communication with the controller; and,
providing for transmitting humidity information to a central computer system for tracking the status of the evidence within the container.

6. The method of claim 1 further comprising the steps of:
providing for receiving at the controller a shock detection signal from a shock sensor disposed within the container and in communication with the controller; and,
providing for transmitting shock detection information to a central computer system for tracking the status of the evidence within the container.

7. The method of claim 1 further comprising the steps of:
providing for receiving at the controller a lock status signal from a lock status sensor disposed within the container and communication with the controller, representing whether the container lock is in a locked state of unlocked state; and,
providing for transmitting lock status information representing whether the container lock is in a locked state of unlocked state, to a central computer system for tracking the status of the evidence within the container.

8. The method of claim 1 further comprising the steps of:
providing for receiving at the controller a lid status signal from a lid status sensor disposed within the container and communication with the controller, representing whether the container lid is in an open position or a closed position; and,
providing for transmitting lock status information representing whether the container lid is in an open position or a closed position, to a central computer system for tracking the status of the evidence within the container.

9. The method of claim 1 further comprising the steps of:
providing for receiving at the controller a digital image signal from a digital camera disposed within the container and communication with the controller, representing a visual image of the evidence within the container; and,
providing for transmitting visual status information representing a visual image of the evidence within the container, to a central computer system for tracking the status of the evidence within the container.

10. The method of claim 1 further comprising the step of:
providing for determining the geographic location of the container using at least one of a GPS enabled locator unit and an RSSI enabled locator unit.

11. The method of claim 1 wherein the step of providing for periodically transmitting the updated container location information to the central computer system is performed using a timing application with the controller for determining when to transmit the updated container location information to the central computer.

12. The method of claim 1 wherein each of the plurality of condition sensors is selected from a group consisting of: an intrusion sensor; an ionizing radiation sensor, an X-ray sensor, a sound sensor; a light sensor, an ultrasound sensor, an infra-red sensor, an electromagnetic field sensor, a current sensor, a voltage sensor, a resistance sensor, a humidity sensor, a pH sensor, an internal temperature sensor, an external temperature sensor, a motion sensor, a change of direction sensor, an acceleration sensor, a speed sensor, a transient vibration sensor, a displacement sensor, an inclination sensor, a shock sensor, a pressure sensor, a weight sensor, a load sensor, a force sensor, a gas sensor, a fine particulates sensor, and a chemical sensor.

13. The method of claim 1 further comprising the steps of:
providing for receiving an lock/unlock time schedule from the central computer representing when the controller should allow the locking means to unlock;
providing for comparing the lock unlock time schedule to real time for determining when the locking means can be unlocked;
providing for preventing the locking means from unlocking when a key is used to attempt to unlock the locking means during a lock time; and,
providing for allowing the locking means to be opened during an unlock time.

14. The method of claim 1 further comprising the steps of:
providing for receiving an lock/unlock location schedule from the central computer representing where the controller should allow the locking means to unlock;
providing for comparing the lock/unlock location schedule to present location information representing the present location of the container received by the controller from the locator unit for determining if the locking means can be unlocked at the present location;
providing for preventing the locking means from unlocking when a key is used to attempt to unlock the locking means at a lock location; and,
providing for allowing the locking means to be opened at an unlock location.

15. The method of claim 1 further comprising the steps of:
providing for determining within an alarm module within the controller if a sensed value from one of the plurality of condition sensors is outside of predetermined thresholds;
providing for transmitting an alarm signal to an alarm unit from the controller; and,
providing for transmitting alarm information representing that a value from at least one of the plurality of a condition sensors is outside of predetermined thresholds, to a central computer system for tracking the status of the evidence within the container.

16. The method of claim 1 wherein the evidence information comprises a unique identification of the container.

17. The method of claim 1 further comprising the step of:
providing for determining when to periodically send the evidence information via RF signals to the central computer system using a timing module within the controller.

18. The method of claim 1 further comprising the steps of:
providing for transmitting the time of loading of evidence into and time of removal of evidence from the container to a central computer system for tracking and storing times of removal and loading of evidence along with the identification of the evidence within an evidence inventory tracking database.

19. The method of claim 1 further comprising the step of:
providing for determining when a person is attempting to penetrate the container using an intrusion sensor.

20. The method of claim 1 further comprising the step of:
providing for issuing an alarm signal to an audible alarm unit.

21. The method of claim 1 further comprising the step of:
providing for transmitting to a central computer system a signal representing that a person is attempting to penetrate the container.

22. The method of claim 1 further comprising the step of:
providing for taking a digital picture each time the lid opens and/or each time a predetermined period of time passes, using a digital camera disposed within the container and in communication with the controller.

23. The method of claim 1 further comprising the step of:
providing for transmitting the digital picture to a central computer system for tracking and monitoring the container and evidence therein.

24. In a method of tracking evidence and actions associated the evidence relative to a container used to store the evidence, the container comprising side and bottom walls forming a unitary container body and an internal space for receiving the cargo; an openable lid hinged to the container body for engaging tops of the side walls; means for locking the lid to the container body for preventing the lid from opening; and, an electronics module disposed within the container, the module having a controller, a battery supply unit connected to and supplying power to the controller, an RF transceiver unit in communication with the controller, an RFID reader in communication with the controller, a plurality of condition sensors disposed within the container and in communication with the controller, and a locator unit in communication with the controller, the method comprising the steps of:
providing for receiving evidence information at a central computer system, the evidence information comprising a unique evidence identifier from an RFID tag associated with the evidence received at the controller through the RFID reader;
providing for receiving evidence in container information at the central computer system, the evidence in container information indicating that the evidence has been placed within the container based on an evidence in container signal received at the controller through at least one of the condition sensors;
providing for receiving container location information at a central computer system, the container location information indicating the present location of the container based on a container location signal from the locator unit received at the controller; and,
providing for receiving an updated container location information at the central computer system for continuous tracking of the status of the evidence within the container.

25. The method of claim 24 further comprising the step of:
providing for generating an inventory log of the evidence comprising inventory log information selected from a group consisting of what evidence was loaded or unloaded from the container, the time and date that the loading or unloading occurred, who loaded or unloaded the cargo, and the location of the container when the load or unload occurred.

26. The method of claim 25 further comprising the step of:
providing for transmitting the inventory log to a user selected from a group consisting of a police officer, a judge, an attorney, a crime lab specialist, an investigator, and an evidence tracking control authority.

27. The method of claim 25 further comprising the step of:
providing for segregating evidence information for a particular crime case to only include evidence information associated with the particular crime case in the evidence log before transmitting the evidence log to the user.

28. The method of claim 25 further comprising the step of:
providing for segregating evidence information for a particular user to only include evidence information associated with the particular user in the evidence log before transmitting the evidence log to the user.

29. The method of claim 25 further comprising the step of:
providing for transmitting mapping information to a client computer, using the location information received from the controller.

30. The method of claim 25 further comprising the step of:
providing for transmitting the evidence information, the evidence in container information, and the updated container location information to a client computer.

31. The method of claim 25 further comprising the steps of:
providing for receiving and tracking all events for evidence from loading of the evidence into the container through removal of the evidence from the container; and,
providing for generating and transmitting to a client computer an audit trail report of all of the tracked events.

32. The method of claim 31 wherein the tracked events are selected from a group consisting of each loading evidence into the container, each unloading of evidence from the container, each locking of the container, each unlocking of the container, each shock occurance to the container, each lid opening of the container, each lid closing of the container, and each movement of the container from one location to another location.

33. The method of claim 32 further comprising the steps of:
providing for determining whether each movement of the container from one location to another location is greater than a predetermined distance; and,
providing for including within the audit trail report movements of the container for which movement of the container from one location to another location is greater than the predetermined distance.

34. The method of claim 32 further comprising the steps of:
determining and storing in memory for each event a time of the event, a date of the event, a location of the event, an identification of evidence for which the event occurred, and an identification of the container associated with the event;
providing for including within the audit trail report for each event the time of the event, the date of the event, the location of the event, the identification of evidence for which the event occurred, and the identification of the container associated with the event.

35. The method of claim 31 further comprising the steps of:
providing for tracking a location path for movement of the container from loading of the evidence into the container to the removal of the evidence from the container; and,
providing for generating and transmitting to a client computer an audit trail report of the location path indicating the movement of the container from the loading of the evidence into the container to the removal of the evidence from the container.

36. The method of claim 24 further comprising the steps of:
providing for tracking a real time location of the container as the container moves from a first location to second location; and,
providing for generating and transmitting to a client computer a map and an indicator of the location of the container within the map as the container moves from the first location to second location within the map.

* * * * *